United States Patent
Li

(10) Patent No.: US 11,095,477 B2
(45) Date of Patent: Aug. 17, 2021

(54) FIXED NETWORK PACKET SENDING METHOD AND SYSTEM

(71) Applicant: HUAWEI TECHNOLOGIES CO., LTD., Shenzhen (CN)

(72) Inventor: Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/858,292

(22) Filed: Apr. 24, 2020

(65) Prior Publication Data

US 2020/0259681 A1 Aug. 13, 2020

Related U.S. Application Data

(63) Continuation of application No. PCT/CN2018/110584, filed on Oct. 17, 2018.

(30) Foreign Application Priority Data

Oct. 26, 2017 (CN) .......................... 201711012982.6

(51) Int. Cl.
*H04L 12/46* (2006.01)
*H04W 76/12* (2018.01)
(Continued)

(52) U.S. Cl.
CPC .......... *H04L 12/4633* (2013.01); *H04L 12/66* (2013.01); *H04L 67/14* (2013.01);
(Continued)

(58) Field of Classification Search
CPC ..... H04L 12/4633; H04L 12/66; H04L 67/14; H04W 76/12; H04W 8/08; H04W 88/16
See application file for complete search history.

(56) References Cited

U.S. PATENT DOCUMENTS 9,998,954 B2 * 6/2018 Roeland .................. H04L 47/76
10,382,226 B2 * 8/2019 Zanier .................. H04L 12/4633
(Continued)

FOREIGN PATENT DOCUMENTS

| CN | 101808430 A | 8/2010 |
|----|-------------|--------|
| CN | 102340866 A | 2/2012 |

(Continued)

OTHER PUBLICATIONS

Draft ETSI TR 181 011 V0.0.14, Telecommunications and Internet converged Services and Protocols for Advanced Networking (TISPAN);Fixed Mobile Covergence:Requirements Analysis, dated Mar. 2007,total 36 pages.

(Continued)

*Primary Examiner* — Ninos Donabed
(74) *Attorney, Agent, or Firm* — Hauptman Ham, LLP

(57) ABSTRACT

A method includes receiving, by an access gateway device, a fixed network packet included in a first fixed network session. The fixed network packet includes fixed network session characteristic information useable to identify the fixed network packet. The method further includes sending, by the access gateway device, the fixed network packet to a user plane function network element based on information of a first interface corresponding to the fixed network session characteristic information. The first interface is an interface between the access gateway device and the user plane function network element. The method further includes receiving, by the user plane function network element, the fixed network packet.

15 Claims, 19 Drawing Sheets

(51) Int. Cl.
*H04L 12/66* (2006.01)
*H04L 29/08* (2006.01)
*H04W 8/08* (2009.01)
*H04W 88/16* (2009.01)

(52) U.S. Cl.
CPC ............ *H04W 8/08* (2013.01); *H04W 76/12* (2018.02); *H04W 88/16* (2013.01)

(56) References Cited

U.S. PATENT DOCUMENTS

| | | | | |
|---|---|---|---|---|
| 2007/0147296 | A1* | 6/2007 | Barbaresi | H04W 16/22 370/331 |
| 2013/0078998 | A1 | 3/2013 | Rui et al. | |
| 2013/0229986 | A1* | 9/2013 | Rasanen | H04L 12/1403 370/328 |
| 2013/0250966 | A1* | 9/2013 | Gu | H04L 45/04 370/401 |
| 2013/0308531 | A1* | 11/2013 | So | H04W 76/10 370/328 |
| 2014/0101305 | A1* | 4/2014 | Kelley, Jr. | H04L 45/24 709/224 |
| 2014/0233384 | A1* | 8/2014 | Howard | H04W 28/0289 370/235 |
| 2014/0314088 | A1* | 10/2014 | Li | H04L 69/22 370/392 |
| 2017/0339600 | A1* | 11/2017 | Roeland | H04L 47/76 |
| 2018/0098246 | A1* | 4/2018 | Hoffmann | H04L 67/16 |
| 2018/0248713 | A1* | 8/2018 | Zanier | H04L 12/4633 |
| 2019/0254089 | A1* | 8/2019 | Huang-Fu | H04W 76/32 |
| 2019/0281015 | A1* | 9/2019 | Yin | H04L 61/2592 |

FOREIGN PATENT DOCUMENTS

| | | |
|---|---|---|
| CN | 102457444 A | 5/2012 |
| EP | 2667678 A2 | 11/2013 |
| WO | 2014111166 A1 | 7/2014 |
| WO | 2016170006 A1 | 10/2016 |

OTHER PUBLICATIONS

Extended European Search Report issued in corresponding European Patent Application No. 18869849.2, dated Sep. 8, 2020, European Patent Office, Munich, Germany.

3GPP TS 23.501 V1.4.0 (Sep. 2017), 3rd Generation Partnership Project;Technical Specification Group Services and System Aspects-;System Architecture for the 5G System;Stage 2(Release 15),total 151 pages.

Rfc1661 W. Simpson, "The Point-to-Point Protocol (PPP)", Network Working Group, Jul. 1994, total 54 pages.

Rfc2516 L. Mamakos et al., "A Method for Transmitting PPP Over Ethernet (PPPoE)", Network Working Group, Feb. 1999, total 17 pages.

Rfc 2131 R. Droms, "Dynamic Host Configuration Protocol", Network Working Group, Mar. 1997, total 45 pages.

Rfc 2132 S. Alexander,"DHCP Options and BOOTP Vendor Extensions", Network Working Group, Mar. 1997, total 34 pages.

* cited by examiner

FIXED NETWORK PACKET SENDING METHOD AND SYSTEM

CROSS-REFERENCE TO RELATED APPLICATIONS

This application is a continuation of International Application No. PCT/CN2018/110584, filed on Oct. 17, 2018, which claims priority to Chinese Patent Application No. 201711012982.6, filed on Oct. 26, 2017, the disclosures of the aforementioned applications are hereby incorporated by reference in their entireties.

TECHNICAL FIELD

This application relates to the field of mobile communications technologies, and in particular, to a fixed network packet sending method, an apparatus, and a system.

BACKGROUND

To address challenges from wireless broadband technologies and keep the 3rd Generation Partnership Project (3GPP) networks at the leading edge, the 3GPP standardization group formulates a next generation mobile communications network architecture (Next Generation System), which is referred to as a 5th generation (5G) network fixed-mobile convergence network architecture. The network architecture not only supports access to a core network (5G Core network) by using a wireless technology (such as long term evolution (LTE) or a 5G radio access network (RAN)) defined by the 3GPP standardization group, but also supports access to the core network by using a fixed network.

However, in the 5G fixed-mobile convergence network architecture, no related solution is currently provided to send a fixed network packet of a terminal in the fixed network to a user plane function network element in the core network.

SUMMARY

This application provides a fixed network packet sending method, an apparatus, and a system, to correctly send a fixed network packet of a terminal on a fixed network side to a user plane function network element in a core network.

To achieve the foregoing objective, this application provides the following technical solutions:

According to some embodiments, this application provides a fixed network packet sending method, including: receiving, by an access gateway device, a fixed network packet carried in a first fixed network session, where the fixed network packet includes fixed network session characteristic information, and the fixed network session characteristic information is used to identify the fixed network packet; and sending, by the access gateway device, the fixed network packet to a user plane function network element based on information about a first interface corresponding to the fixed network session characteristic information, where the first interface is an interface between the access gateway device and the user plane function network element.

In the foregoing method, the access gateway device may obtain the fixed network session characteristic information carried in the fixed network packet, and determine, based on the fixed network session characteristic information, the information about the first interface corresponding to the fixed network session characteristic information, so as to send the fixed network packet to a UPF based on the information about the first interface. In this way, the fixed network packet is correctly sent to the UPF.

In some embodiments, the access gateway device determines the fixed network session characteristic information; and the access gateway device establishes an association relationship between the fixed network session characteristic information and the information about the first interface.

In some embodiments, the fixed network session characteristic information is line information, the line information includes link information and virtual interface information, the link information is used to indicate access information of the terminal, and the virtual interface information is used to indicate a virtual port for access of the fixed network packet.

In some embodiments, that the access gateway device determines the fixed network session characteristic information includes: receiving, by the access gateway device, a signaling packet carried in the first fixed network session, where the signaling packet includes first fixed network session characteristic information; and obtaining, by the access gateway device, the first fixed network session characteristic information from the signaling packet, and determining the fixed network session characteristic information of the fixed network packet based on the first fixed network session characteristic information.

In some embodiments, the first fixed network session characteristic information is the line information. The determining, by the access gateway device, the fixed network session characteristic information of the fixed network packet based on the first fixed network session characteristic information includes: determining, by the access gateway device, the line information as the fixed network session characteristic information of the fixed network packet.

In some embodiments, the first fixed network session characteristic information is packet characteristic information, and the packet characteristic information includes one or more of a media access control MAC address, virtual local area network VLAN information, and a session protocol type. The determining, by the access gateway device, the fixed network session characteristic information of the fixed network packet based on the first fixed network session characteristic information includes: determining, by the access gateway device based on the packet characteristic information, the line information corresponding to the packet characteristic information; and determining, by the access gateway device, the line information as the fixed network session characteristic information of the fixed network packet.

In some embodiments, the method further includes: sending, by the access gateway device, a session creation message and the line information to an access and mobility management function network element, where the session creation message is associated with the line information; receiving, by the access gateway device, a session creation completion message sent by the access and mobility management function network element, where the session creation completion message includes tunnel information of the user plane function network element and is associated with the line information; and obtaining, by the access gateway device based on the line information, the tunnel information of the user plane function network element from the session creation completion message associated with the line information. That the access gateway device establishes an association relationship between the fixed network session characteristic information and the information about the first interface includes: establishing, by the access gateway device, an association relationship between the line information and the information about the first interface, where the information about the first interface includes the tunnel information of the user plane function network element and tunnel information of the access gateway device.

In some embodiments, that the access gateway device determines the fixed network session characteristic information includes: receiving, by the access gateway device, a signaling packet carried in a second fixed network session and obtaining the link information from the signaling packet, where the signaling packet includes the link information; receiving, by the access gateway device, a session creation message and sending the session creation message to an access and mobility management function network element, where the session creation message includes the virtual interface information; receiving, by the access gateway device, the virtual interface information from the access and mobility management function network element; and determining, by the access gateway device, the fixed network session characteristic information based on the link information and the virtual interface information.

In some embodiments, that the access gateway device determines the fixed network session characteristic information includes: receiving, by the access gateway device, a signaling packet carried in a second fixed network session, where the signaling packet includes the link information; obtaining, by the access gateway device, the link information from the signaling packet and sending the link information to an access and mobility management function network element; receiving, by the access gateway device, a session creation message and sending the session creation message to the access and mobility management function network element, where the session creation message includes the virtual interface information; and receiving, by the access gateway device, the fixed network session characteristic information from the access and mobility management function network element.

In some embodiments, that the access gateway device determines the fixed network session characteristic information includes: receiving, by the access gateway device, a session creation message and sending the session creation message to an access and mobility management function network element, where the session creation message includes service information corresponding to the fixed network packet; receiving, by the access gateway device, the service information from the access and mobility management function network element; and determining, by the access gateway device from subscription data based on the service information, the fixed network session characteristic information corresponding to the service information.

In some embodiments, that the access gateway device determines the fixed network session characteristic information includes: receiving, by the access gateway device, a session creation message and sending the session creation message to an access and mobility management function network element, where the session creation message includes service information corresponding to the fixed network packet; and receiving, by the access gateway device, the fixed network session characteristic information that corresponds to the service information and that is sent by the access and mobility management function network element.

In some embodiments, that the access gateway device determines the fixed network session characteristic information includes: receiving, by the access gateway device, a signaling packet and obtaining the link information from the signaling packet, where the signaling packet includes the link information; sending, by the access gateway device, a request message to a resource management network element, where the request message includes the link information and is used to request allocation of a fixed network session resource; receiving, by the access gateway device, the virtual interface information from the resource management network element; and determining, by the access gateway device, the fixed network session characteristic information based on the link information and the virtual interface information.

In some embodiments, that the access gateway device determines the fixed network session characteristic information includes: receiving, by the access gateway device, a signaling packet and obtaining the link information from the signaling packet, where the signaling packet includes the link information; receiving, by the access gateway device, the virtual interface information that is sent by the terminal through a second interface, where the second interface is an interface between the terminal and the access gateway device; and determining, by the access gateway device, the fixed network session characteristic information based on the link information and the virtual interface information.

In some embodiments, the fixed network session characteristic information is packet characteristic information, and the packet characteristic information includes one or more of a media access control MAC address, virtual local area network VLAN information, and a session protocol type.

In some embodiments, that the access gateway device determines the fixed network session characteristic information includes: receiving, by the access gateway device, the fixed network session characteristic information that is sent by a terminal through a second interface, where the second interface is an interface between the terminal and the access gateway device.

In some embodiments, the method further includes: establishing, by the access gateway device, a correspondence between the fixed network session characteristic information and identification information, where the identification information is used to identify a to-be-created session; sending, by the access gateway device, a session creation message and the identification information to the access and mobility management function network element, where the session creation message is associated with the identification information; receiving, by the access gateway device, a session creation completion message sent by the access and mobility management function network element, where the session creation completion message includes tunnel information of the user plane function network element and is associated with the identification information; and obtaining, by the access gateway device, the tunnel information of the user plane function network element from the session creation completion message based on the correspondence between the fixed network session characteristic information and the identification information. That the access gateway device establishes an association relationship between the fixed network session characteristic information and the information about the first interface includes: establishing, by the access gateway device, an association relationship between the line information and the information about the first interface, where the information about the first interface includes the tunnel information of the user plane function network element and tunnel information of the access gateway device.

In some embodiments, the method further includes: receiving, by the access gateway device from the terminal, an identifier of an internet protocol IP obtaining mode, where the identifier of the IP obtaining mode is a point-to-point protocol over Ethernet PPPoE; and allocating, by the access gateway device, a PPPoE session identifier and sending the PPPoE session identifier to the access and mobility management function network element.

According to some embodiments, this application provides an apparatus. The apparatus may be an access gateway device, or may be a chip in an access gateway device. The apparatus has a function of implementing the embodiments. The function may be implemented by hardware, or may be implemented by hardware by executing corresponding software. The hardware or the software includes one or more modules corresponding to the foregoing function.

In some embodiments, when the apparatus is the access gateway device, the access gateway device includes a receiving unit and a sending unit. In some embodiments, the access gateway device further includes a processing unit. The processing unit may be, for example, a processor. The receiving unit may be, for example, a receiver. The sending unit may be, for example, a transmitter. The receiver and the transmitter include a radio frequency circuit. In some embodiments, the access gateway device further includes a storage unit, and the storage unit may be, for example, a memory. When the access gateway device includes a storage unit, the storage unit stores a computer-executable instruction. The processing unit is connected to the storage unit. The processing unit executes the computer-executable instruction stored in the storage unit, so that the access gateway device performs the fixed network packet sending method.

In another possible design, when the apparatus is the chip in the access gateway device, the chip includes a receiving unit and a sending unit. In some embodiments, the chip further includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute a computer-executable instruction stored in a storage unit, so that the fixed network packet sending method is performed. In some embodiments, the storage unit is a storage unit in the chip, for example, a register or a cache. The storage unit may further be a storage unit located outside the chip in the access gateway device, for example, a read-only memory (ROM), another type of static storage device capable of storing static information and instructions, or a random access memory (RAM).

Any one of the processors mentioned above may be a general-purpose central processing unit (CPU), a microprocessor, an application-specific integrated circuit (ASIC), or one or more integrated circuits configured to control program execution of the fixed network packet sending method.

According to some embodiments, this application provides a system, including the access gateway device and the user plane function network element in the foregoing method embodiment or the apparatus embodiment. In some embodiments, the system further includes an access and mobility management function network element.

According to some embodiments, this application further provides a computer-readable storage medium, where the computer-readable storage medium stores an instruction, and when the instruction is run on a computer, the computer is enabled to perform the method in the foregoing aspects.

According to some embodiments, this application further provides a computer program product including an instruction, and when the instruction is run on a computer, the computer is enabled to perform the method in the foregoing embodiments.

In addition, for a technical effect brought by any one of the embodiments, refer to the technical effect brought by the different designs in the other embodiments. Details are not described herein again.

The aspects or other aspects of this application may be made more comprehensible in descriptions in the following embodiments.

DESCRIPTION OF EMBODIMENTS

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" indicates at least two.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to similar technical issues as the network architecture evolves and a new service scenario emerges.

Figure 1:
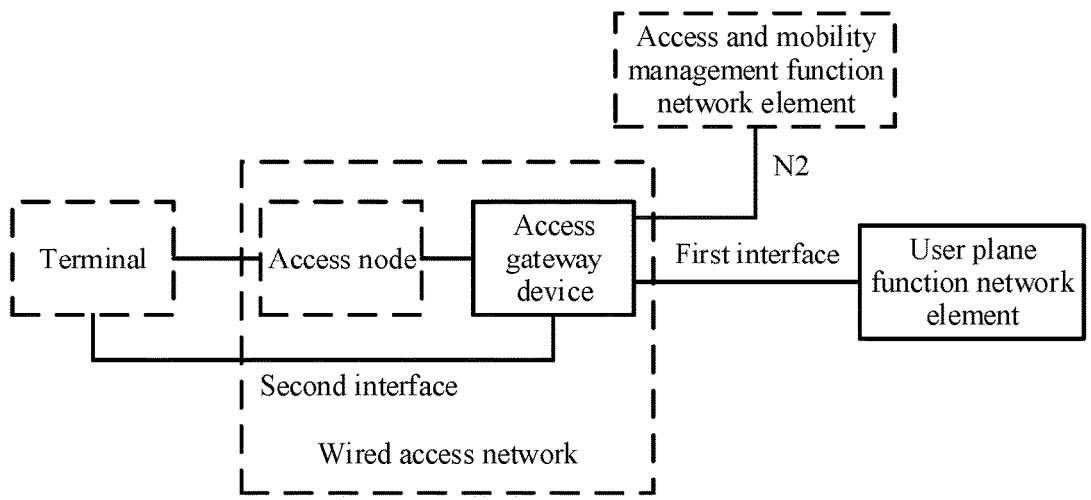
FIG. 1 is a schematic diagram of a possible network architecture according to at least an embodiment of this application.

FIG. 1 is a schematic diagram of a possible network architecture to which this application is applicable. The network architecture includes an access gateway device and a user plane function network element. In some embodiments, the network architecture further includes a terminal and an access node (AN). In some embodiments, the network architecture further includes an access and mobility management function network element.

The access gateway device is an access node for connecting a fixed network to a core network. The access gateway device may communicate with a network element, such as an access and mobility management function network element, on a core network control plane through an N2 interface. The access gateway device may further send a data packet (also referred to as a fixed network packet) of a user in the fixed network to a network element (for example, the user plane function network element) on a core network user plane through an N3 interface. The N3 interface is an interface between the access gateway device and the user plane function network element. In this application, the N3 interface is also referred to as a first interface.

The core network includes a user plane network element and a control plane network element. The user plane network element is mainly responsible for forwarding a data packet, controlling quality of service (QoS), collecting statistics about charging information, and the like. The control plane network element is mainly responsible for delivering a data packet forwarding policy, a QoS control policy, or the like to the user plane network element. In the architecture shown in FIG. 1, the user plane function network element is a user plane network element in the core network. The access gateway device and the user plane function network element may exchange a fixed network packet through the first interface (namely, the N3 interface).

The terminal includes, for example, a residential gateway (RG). The RG includes, for example, a modem (modem). The terminal is a fixed gateway device supporting 5G access. The terminal may send a non-access stratum (NAS) message to the AMF network element on the core network control plane through an N1 interface by using an air interface or the fixed network, where the N1 interface is an interface between the terminal and the AMF network element. The terminal may be connected to a remote device in a wired or wireless manner. The remote device may be, for example, a personal computer (PC), a set-top box (STB), or user equipment (UE).

The access node AN is also referred to as a wireline access node (WAN). The AN may provide an access service for the terminal in different access manners.

The terminal may communicate with the access gateway device through a second interface.

It should be noted that the AN and the access gateway device may be collectively referred to as a device in a wired access network.

In some embodiments, the terminal may access the core network in a wired manner by using the device in the wired access network. In another some embodiments, the terminal may further access the core network in a wireless (or referred to as the air interface) manner by using a device, such as a base station, in a radio access network (RAN). In other words, the terminal may send an air interface message to the core network.

The access and mobility management function network element, for example, may be referred to as the access and mobility management function network element (AMF) in 5G. The access and mobility management function network element is responsible for access management and mobility management of an access device. The access and mobility management function network element includes a mobility management function of a mobility management entity (MME) in a network framework in LTE, and further includes an access management function.

In a method in this application, the access gateway device is configured to: receive a fixed network packet carried in a first fixed network session, where the fixed network packet includes fixed network session characteristic information, and the fixed network session characteristic information is used to identify the fixed network packet; and send the fixed network packet to the user plane function network element based on information about a first interface corresponding to the fixed network session characteristic information, where the first interface is an interface between the access gateway device and the user plane function network element.

The user plane function network element is configured to receive the fixed network packet from the access gateway device.

The fixed network packet includes the fixed network session characteristic information, and the fixed network session characteristic information is used to identify the fixed network packet. The fixed network packet may be, for example, a point-to-point protocol over Ethernet (PPPoE) packet, a dynamic host configuration protocol (DHCP) packet, a user internet protocol (IP) packet, or an Ethernet packet. The PPPoE packet includes a PPPoE discovery packet, and the DHCP packet includes a DHCP discovery packet.

The access gateway device obtains, based on the obtained fixed network session characteristic information, the information about the first interface corresponding to the fixed network session characteristic information. The first interface is an interface between the access gateway device and the user plane function network element. Therefore, the access gateway device may send the fixed network packet to the user plane function network element through the first interface.

The information about the first interface is information about a virtual tunnel between the access gateway device and the user plane function network element, for example, includes a general packet radio service (GPRS) tunneling protocol for the user plane (GTP-U), and/or a tunnel endpoint identifier (TEID).

By using the foregoing steps, after receiving the fixed network packet carried in the first fixed network session, the access gateway device may obtain the fixed network session characteristic information carried in the fixed network packet, and determine, based on the fixed network session characteristic information, the information about the first interface corresponding to the fixed network session characteristic information, so as to send the fixed network packet to the user plane function network element through the first interface based on the information about the first interface. In this way, the fixed network packet is correctly sent to the user plane function network element.

In some embodiments, the access gateway device is further configured to: determine the fixed network session characteristic information of the fixed network packet; and establish an association relationship between the fixed network session characteristic information and the information about the first interface.

In some embodiments, the fixed network session characteristic information is line information, the line information includes link information and virtual interface information, the link information is used to indicate access information of the terminal, and the virtual interface information is used to indicate a virtual port for access of the fixed network packet. In some embodiments, a system further includes the access and mobility management function network element.

The access gateway device is configured to: send a session creation message and the line information to the access and mobility management function network element, where the session creation message is associated with the line information; obtain, based on the line information, tunnel information of the user plane function network element from a session creation completion message associated with the line information, where the information about the first interface includes the tunnel information of the user plane function network element and tunnel information of the access gateway device; and establish an association relationship between the line information and the information about the first interface.

The access and mobility management function network element is configured to send the session creation completion message to the access gateway device, where the session creation completion message includes the tunnel information of the user plane function network element, and the session creation completion message is associated with the line information.

In some embodiments, the fixed network session characteristic information is line information, the line information includes link information and virtual interface information, the link information is used to indicate access information of the terminal, and the virtual interface information is used to indicate a virtual port for access of the fixed network packet. In some embodiments, a system further includes the access and mobility management function network element.

That the access gateway device is configured to determine the fixed network session characteristic information of the fixed network packet specifically includes: receiving a signaling packet carried in a second fixed network session and obtaining the link information from the signaling packet, where the signaling packet includes the link information; receiving a session creation message and sending the session creation message to the access and mobility management function network element, where the session creation message includes the virtual interface information; and determining the fixed network session characteristic information based on the link information and the virtual interface information.

The access and mobility management function network element is configured to send the virtual interface information to the access gateway device.

In some embodiments, the fixed network session characteristic information is line information, the line information includes link information and virtual interface information, the link information is used to indicate access information of the terminal, and the virtual interface information is used to indicate a virtual port for access of the fixed network packet. In some embodiments, a system further includes the access and mobility management function network element.

That the access gateway device is configured to determine the fixed network session characteristic information of the fixed network packet specifically includes: receiving a signaling packet carried in a second fixed network session, where the signaling packet includes the link information; obtaining the link information from the signaling packet and sending the link information to the access and mobility management function network element; receiving a session creation message including the virtual interface information, and sending the session creation message to the access and mobility management function network element; and using, as the fixed network session characteristic information of the fixed network packet, the fixed network session characteristic information that is received from the access and mobility management function network element.

The access and mobility management function network element is configured to send the fixed network session characteristic information to the access gateway device.

In some embodiments, the fixed network session characteristic information is line information, the line information includes link information and virtual interface information, the link information is used to indicate access information of the terminal, and the virtual interface information is used to indicate a virtual port for access of the fixed network packet. In some embodiments, a system further includes the access and mobility management function network element.

That the access gateway device is configured to determine the fixed network session characteristic information of the fixed network packet specifically includes: receiving a session creation message and sending the session creation message to the access and mobility management function network element, where the session creation message includes service information corresponding to the fixed network packet; and determining, from subscription data based on the service information, the fixed network session characteristic information corresponding to the service information.

The access and mobility management function network element is configured to send the service information to the access gateway device.

In some embodiments, the fixed network session characteristic information is line information, the line information includes link information and virtual interface information, the link information is used to indicate access information of the terminal, and the virtual interface information is used to indicate a virtual port for access of the fixed network packet. In some embodiments, a system further includes the access and mobility management function network element.

That the access gateway device is configured to determine the fixed network session characteristic information of the fixed network packet specifically includes: receiving a session creation message and sending the session creation message to the access and mobility management function network element, where the session creation message includes service information corresponding to the fixed network packet; and using, as the fixed network session characteristic information of the fixed network packet, the fixed network session characteristic information that is received from the access and mobility management function network element.

The access and mobility management function network element is configured to send the fixed network session characteristic information corresponding to the service information to the access gateway device.

In some embodiments, the access gateway device is configured to: establish a correspondence between the fixed network session characteristic information and identification information, where the identification information is used to identify a to-be-created session; send a session creation message and the identification information to the access and mobility management function network element, where the session creation message is associated with the identification information; obtain tunnel information of the user plane function network element from a session creation completion message based on the correspondence between the fixed network session characteristic information and the identification information, where the information about the first interface includes the tunnel information of the user plane function network element and tunnel information of the access gateway device; and establish an association relationship between the line information and the information about the first interface.

The access and mobility management function network element is configured to send the session creation completion message to the access gateway device, where the session creation completion message includes the tunnel information of the user plane function network element, and the session creation completion message is associated with the identification information.

Figure 2:
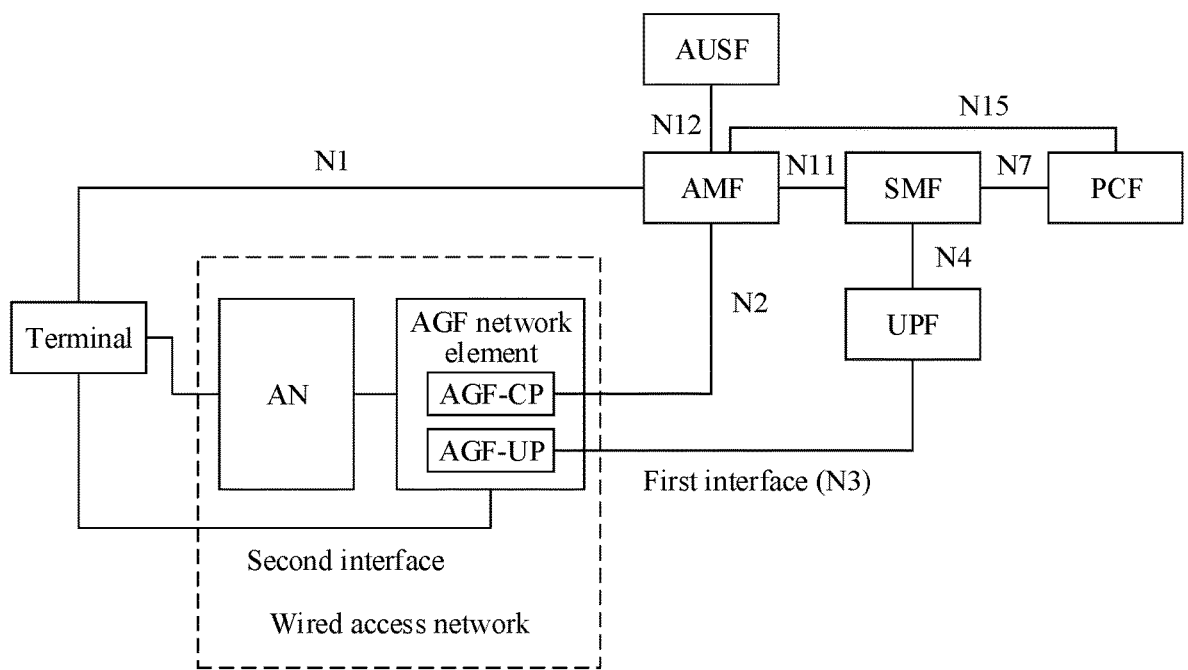
FIG. 2 is a schematic diagram of another possible network architecture according to at least an embodiment of this application.

FIG. 2 is a schematic diagram of a network architecture to which this application is applicable. Network elements in the network architecture include a terminal, a device in a wired access network, and a core network element. The network architecture shown in FIG. 2 is a specific application scenario of the network architecture shown in FIG. 1.

For specific descriptions of the terminal, the device in the wired access network, an access and mobility management function network element, and a user plane function network element, refer to the foregoing related descriptions in the system architecture shown in FIG. 1. Details are not described herein again.

The access gateway device in the architecture shown in FIG. 1 may be an access gateway function (AGF) network element or the like in a 5G fixed-mobile convergence network architecture. The user plane function network element may be referred to as a user plane function (UPF) network element in 5G. Certainly, the access gateway device and the user plane function network element may alternatively be other network elements. This is not limited in this application.

In FIG. 2, an example in which the access gateway device is the AGF network element and the user plane function network element is referred to as the UPF network element is used for description.

The core network element in FIG. 2 includes a control plane network element and a user plane network element. The control plane network element includes the access and mobility management function network element (the access and mobility management function network element is also referred to as an AMF network element in 5G, and the AMF network element is used as an example in the figure), a session management function (SMF) network element, a policy control function (PCF) network element, and an authentication server function (AUSF) network element. The user plane network element includes the user plane function network element (in FIG. 2, an example in which the user plane function network element is the UPF network element is used).

For ease of description, in this application, the AGF network element, the AMF network element, the SMF network element, the PCF network element, the AUSF network element, and the UPF network element are respectively referred to as an AGF, an AMF, an SMF, a PCF, an AUSF, and a UPF for short below.

In FIG. 2, the AGF includes an AGF control plane (AGF-CP) and an AGF user plane (AGF-UP). The AGF-CP is configured to process control plane signaling and manage the AGF-UP, for example, deliver a control policy to the AGF-UP. The AGF-UP is configured to process user plane data according to the control policy delivered by the AGF-CP. The AGF-CP may communicate with the AMF through an N2, and the AGF-UP communicates with the UPF through an N3 interface (also referred to as a first interface). The terminal may directly communicate with the AGF through a second interface. The terminal may communicate with the AMF through an N1 interface. The UPF may communicate with the SMF through an N4 interface. The SMF may communicate with the PCF through an N7 interface. The AMF may communicate with the SMF through an N11 interface. The AMF may communicate with the AUSF through an N12 interface.

The following separately describes functions of network elements in a core network in FIG. 2.

The SMF is responsible for session management, for example, establishment of a user session.

The PCF is configured to perform policy control, and is mainly responsible for policy authorization, generation of QoS and a charging rule, and delivery of a corresponding rule to the UPF by using the SMF, to complete installation of a corresponding policy and rule.

The AUSF has an authentication service function, and is configured to terminate an authentication function requested by a security anchor function (SEAF) network element.

It should be noted that a name of an interface between network elements in FIG. 1 and FIG. 2 is merely an example, and the interface may have another name In some embodiments. This is not specifically limited in embodiments of this application.

It should be noted that the terminal, the access node, the access gateway device, the user plane function network element, the access and mobility management function network element, and the like in FIG. 1 and FIG. 2 are merely names, and the names constitute no limitation on the devices. The terminal, the access node, the access gateway device, the user plane function network element, and the access and mobility management function network element may have other names in a 5G network and another future network. This is not specifically limited in the embodiments of this application. For example, the terminal may alternatively be replaced by a terminal device, user equipment, or the like. The access node may alternatively be replaced by a wireline access node, a fixed network access node, or the like. The access gateway device may alternatively be replaced by a gateway device, an access gateway function device, or the like. A general description is provided herein, and details are not described below again.

In some embodiments, the access node and the access gateway device in FIG. 1 may be implemented by using a physical device, or may be jointly implemented by using a plurality of physical devices, or may be implemented by using a logical functional module in a physical device. This is not specifically limited in this embodiment of this application.

It should be noted that, a fixed network session sending method in this application may be performed by an apparatus. The apparatus may be an access gateway device or a chip in the access gateway device, or may further be an access and mobility management function network element or a chip in the access and mobility management function network element.

For ease of description, in this application, an example in which the apparatus is the access gateway device or the access and mobility management function network element is used to describe the fixed network session sending method. For a method in which the apparatus is the chip in the access gateway device or the chip in the access and mobility management function network element, refer to specific descriptions of the fixed network session sending method in which the apparatus is the access gateway device or the access and mobility management function network element. Details are not described again.

With reference to FIG. 1 and FIG. 2, the following describes in detail a fixed network packet sending method provided in this application.

Figure 3:
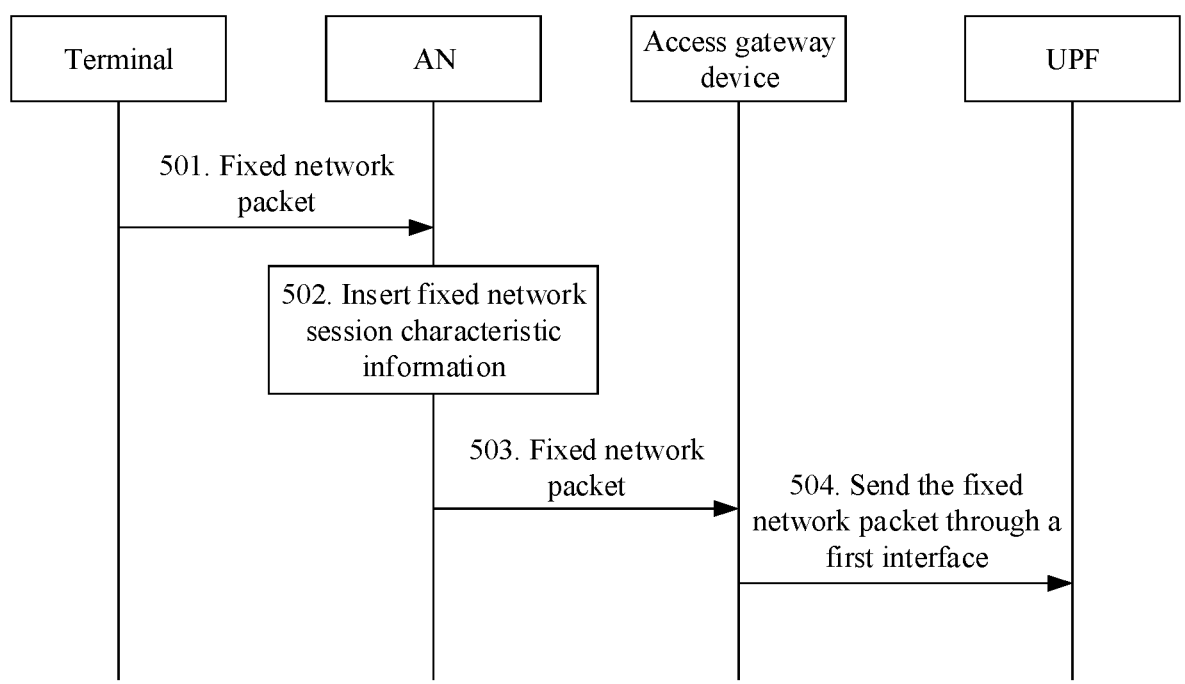
FIG. 3 is a fixed network packet sending method according to at least an embodiment of this application.

In some embodiments, if fixed network session characteristic information carried in a fixed network packet received by an access gateway device is line information, refer to FIG. 3 for a fixed network packet sending method. The method includes the following steps:

Step 501: A terminal sends a fixed network packet carried in a first fixed network session to an AN, and the AN receives, from the terminal, the fixed network packet carried in the first fixed network session.

The fixed network packet does not include the fixed network session characteristic information.

Step 502: The AN inserts the fixed network session characteristic information into the received fixed network packet.

The inserted fixed network session characteristic information is the line information.

Step 503: The AN sends, to the access gateway device, a fixed network packet that is carried in the first fixed network session and that carries the fixed network session characteristic information, and the access gateway device receives the fixed network packet from the AN.

Step 504: The access gateway device sends the fixed network packet to a UPF based on information about a first interface corresponding to the fixed network session characteristic information, and the UPF receives the fixed network packet from the access gateway device.

For step 504, refer to the foregoing description of the network architecture part in FIG. 2. Details are not described again.

In some embodiments, in steps 501 to 504, the fixed network session characteristic information is the line information, and is inserted into the fixed network packet by the AN.

In some embodiments, the line information includes link information and virtual interface information, the link information is used to indicate access information of the terminal, and the virtual interface information is used to indicate a virtual port for access of the fixed network packet. A virtual interface is also referred to as a logical interface.

In some embodiments, the link information includes information about the AN and information about a port that is on the AN and that is accessed by the terminal. The information about the AN may be, for example, one or more of a name of the AN, an identifier of the AN, and an IP of the AN.

For example, it is assumed that the access gateway device accesses an AN1 and an AN2. The AN1 has two access ports: an access port 1 and an access port 2. The AN2 has three access ports: an access port 1, an access port 2, and an access port 3. In this case, the access ports managed by the access gateway device may be represented as: the AN1+ the access port 1, the AN1+ the access port 2, the AN2+ the access port 1, the AN2+ the access port 2, and the AN2+ the access port 3.

Certainly, in practice, another manner may be used to manage the access ports of the ANs. For example, in the foregoing example, the five ports may be numbered on the access gateway device. In this case, the access ports managed by the access gateway device may be represented as an access port 1' (representing the AN1+ the access port 1), an access port 2' (representing the AN1+ the access port 2), an access port 3' (representing the AN2+ the access port 1), an access port 4' (representing the AN2+ the access port 2), and an access port 5' (representing the AN2+ the access port 3).

The virtual interface information is information that can distinguish between virtual channels of the fixed network packet on the AN. It may also be understood that each port on the AN includes a plurality of virtual interfaces. The virtual interface information may be, for example, information about a virtual path identifier (VPI) or a virtual channel identifier (VCI) in a digital subscriber line (DSL), or information about a virtual local area network (VLAN) accessed by the Ethernet. For example, the access port 1' (representing the AN1+ the access port 1) may further include a plurality of virtual interfaces, for example, includes three virtual interfaces: a virtual interface 1, a virtual interface 2, and a virtual interface 3. Similarly, other access ports each may also include one or more virtual interfaces.

Different fixed network access manners may be used between the terminal and the AN. For each of the different access manners, a virtual interface is used between the terminal and the AN, so that the AN can identify a service through a virtual interface through which the fixed network packet is received.

Figure 4:
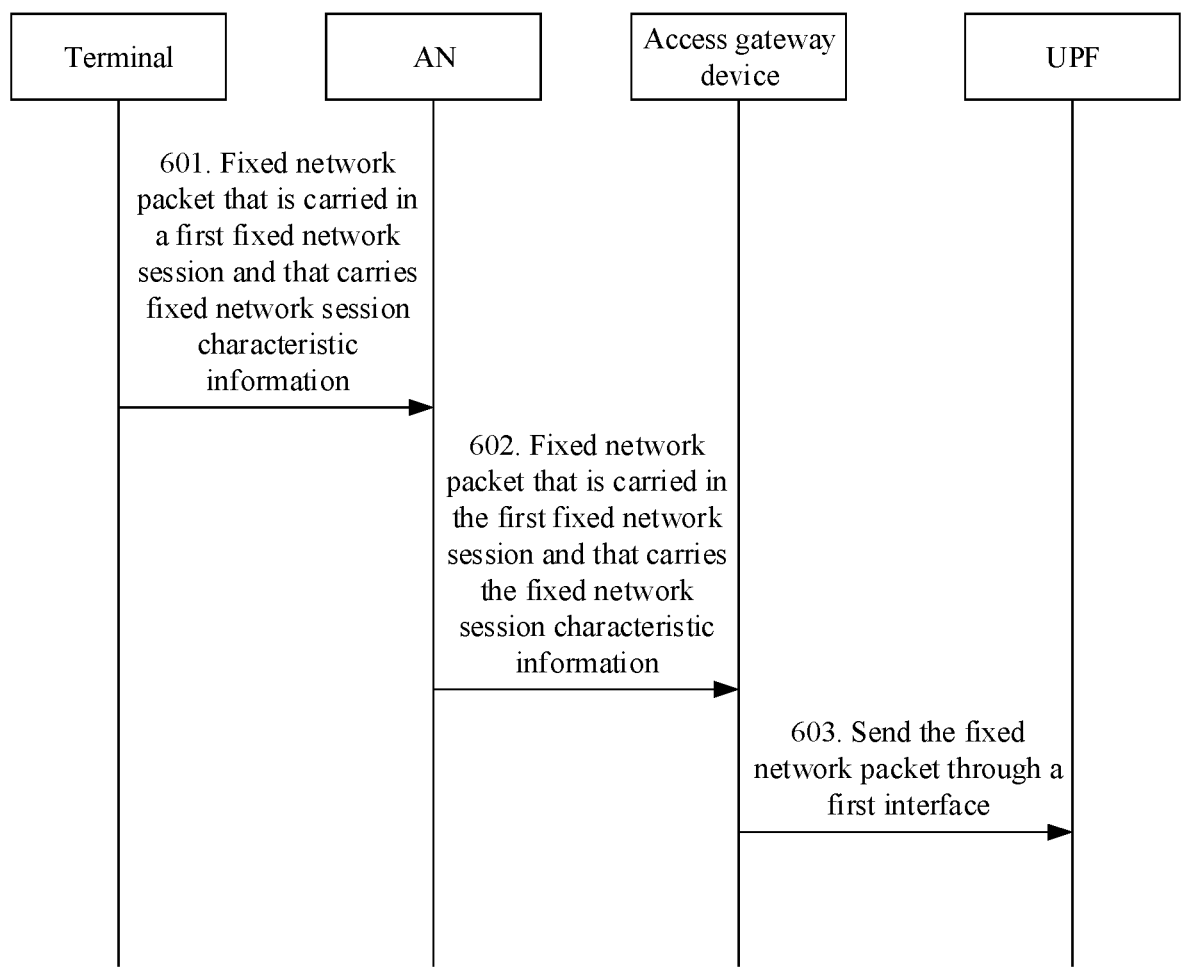
FIG. 4 is a fixed network packet sending method according to at least an embodiment of this application.

In another implementation, if fixed network session characteristic information carried in a fixed network packet received by an access gateway device is packet characteristic information, a fixed network packet sending method shown in FIG. 4 may be used for sending the fixed network packet. Referring to FIG. 4, the method includes the following steps:

Step 601: A terminal sends, to an AN, a fixed network packet that is carried in a first fixed network session and that carries the fixed network session characteristic information, and the AN receives the fixed network packet from the terminal.

The fixed network session characteristic information is the packet characteristic information.

Step 602: The AN sends, to the access gateway device, the fixed network packet that is carried in the first fixed network session and that carries the fixed network session characteristic information, and the access gateway device receives the fixed network packet from the AN.

Step 603: The access gateway device sends the fixed network packet to a UPF based on information about a first interface corresponding to the fixed network session characteristic information, and the UPF receives the fixed network packet from the access gateway device.

For a specific implementation of step 603, refer to the foregoing description of the network architecture in FIG. 2. Details are not described again.

In this implementation, in steps 601 to 603, the fixed network session characteristic information is the packet characteristic information, and is carried in the fixed network packet sent by the terminal.

In an implementation, the packet characteristic information includes one or more of a media access control (MAC) address, VLAN information, and a session protocol type. In some embodiments, the packet characteristic information may be inserted into the fixed network packet by the AN after the AN receives the fixed network packet sent by the terminal. Alternatively, the packet characteristic information may be added to the fixed network packet by the terminal and is sent to the AN.

In step 504 shown in FIG. 3 or step 603 shown in FIG. 4, when sending the fixed network packet, the access gateway device determines information about a corresponding first interface by using the fixed network session characteristic information carried in the fixed network packet, and then may send the fixed network packet to the UPF through the first interface.

It should be noted that the first interface is an interface between the access gateway device and the UPF. However, there may be a plurality of logical channels for the first interface, and each logical channel is identified by using one piece of information about the first interface. In other words, the information about the first interface may be used to determine which logical channel of the first interface is used to send the fixed network packet from the access gateway device to the UPF.

To correctly determine the information about the first interface corresponding to the fixed network session characteristic information, an implementation is to pre-establish an association relationship between the fixed network session characteristic information and the information about the first interface. For example, a correspondence between the fixed network session characteristic information and the information about the first interface may be established in a form of a table. Alternatively, a function mapping relationship between the fixed network session characteristic information and the information about the first interface is established in a function mapping manner. Alternatively, another manner may further be used to establish the association relationship the fixed network session characteristic information and the information about the first interface. This is not limited in this application.

To establish the association relationship between the fixed network session characteristic information and the information about the first interface, at least the following method is implemented before step 504 or step 603: The access gateway device determines the fixed network session characteristic information, and establishes the association relationship between the fixed network session characteristic information and the information about the first interface.

The following separately describes several methods for determining the fixed network session characteristic information, and a manner, for each method, of establishing the association relationship between the fixed network session characteristic information and the information about the first interface.

Descriptions are separately provided below when the fixed network session characteristic information is the line information or the packet characteristic information.

Case 1: The fixed network session characteristic information that is carried in the fixed network packet and that is received by the access gateway device is the line information.

Case 1 corresponds to the fixed network packet sending method shown in FIG. 3.

In Case 1, before step 504 shown in FIG. 3 is performed, any one of the following implementation methods 1 to 7 is used to determine the line information carried in the fixed network packet, and then an association relationship between the line information and the information about the first interface is further established.

In a common implementation method, generally, the association relationship between the line information and the information about the first interface is established before step 501. To be specific, the method in this application is performed in the following sequence:

Step 1: Perform the any one of the following implementation methods 1 to 7, to determine the fixed network session characteristic information (the line information) that is to be inserted into the fixed network packet in step 502, and then establish the association relationship between the determined fixed network session characteristic information and the information about the first interface.

Step 2: Perform steps 501 to 504.

In some embodiments, step 1 may alternatively be performed between step 501 and step 504. In other words, step 1 is performed before step 504.

The following describes a method for determining the fixed network session characteristic information that is to be inserted into the fixed network packet in step 502.

Method 1: The access gateway device receives a signaling packet carried in the first fixed network session, where the signaling packet includes first fixed network session characteristic information. The access gateway device obtains the first fixed network session characteristic information from the signaling packet, and determines the fixed network session characteristic information of the fixed network packet based on the first fixed network session characteristic information.

The first fixed network session characteristic information included in the signaling packet that is received by the access gateway device may be the line information, or may be the packet characteristic information.

Figure 5:
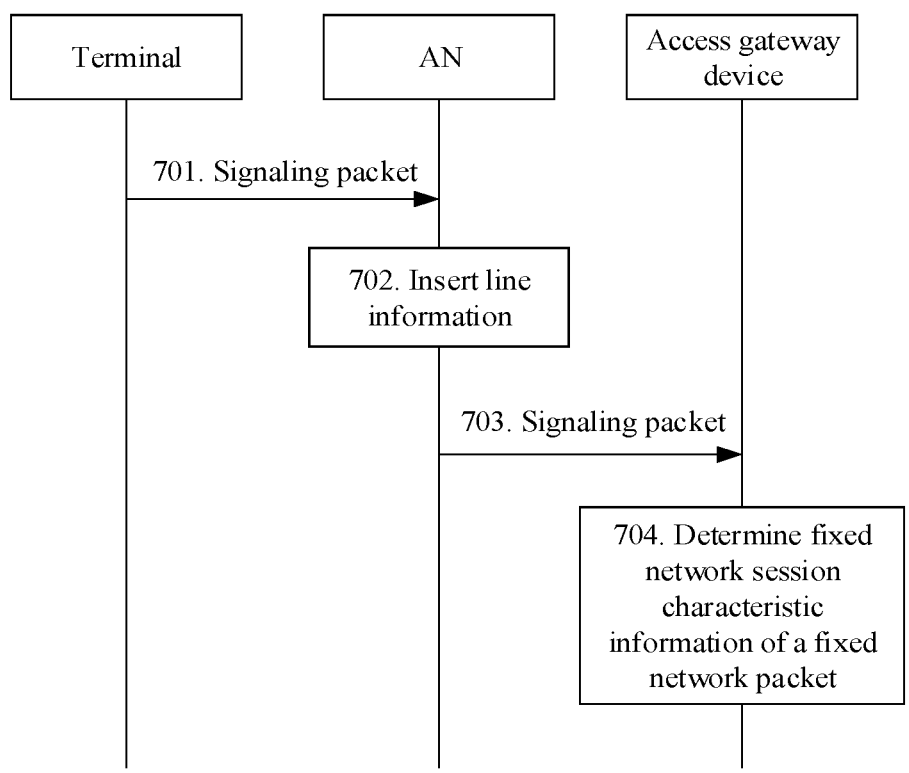
FIG. 5 is a method for determining fixed network session characteristic information according to at least an embodiment of this application.

For example, if the first fixed network session characteristic information is the line information, method 1 may use a method shown in FIG. 5.

As shown in FIG. 5, a method for determining the fixed network session characteristic information includes the following steps:

Step 701: The terminal sends the signaling packet carried in the first fixed network session to the AN, and the AN receives the signaling packet from the terminal.

Step 702: The AN inserts the line information into the signaling packet.

In the foregoing step 701, the signaling packet sent by the terminal to the AN is carried in the first fixed network session, and in step 501, the signaling packet sent by the terminal to the AN is also carried in the first fixed network session. Line information in a same fixed network session does not change. Therefore, the line information inserted into the signaling packet by the AN in step 702 is the same as the line information inserted into the fixed network packet by the AN in step 502.

Step 703: The AN sends, to the access gateway device, a signaling packet that is carried in the first fixed network session and that carries the line information, and the access gateway device receives the signaling packet from the AN.

Step 704: The access gateway device determines the line information in the signaling packet as the fixed network session characteristic information of the fixed network packet.

To be specific, after obtaining the line information from the signaling packet, the access gateway device determines that the line information is the line information that is to be inserted into the fixed network packet in the subsequent step 502.

By using the foregoing steps 701 to 704, the line information carried in the fixed network packet that is subsequently received by the access gateway device may be obtained.

After steps 701 to 704, the association relationship between the line information and the information about the first interface is established.

Figure 6:
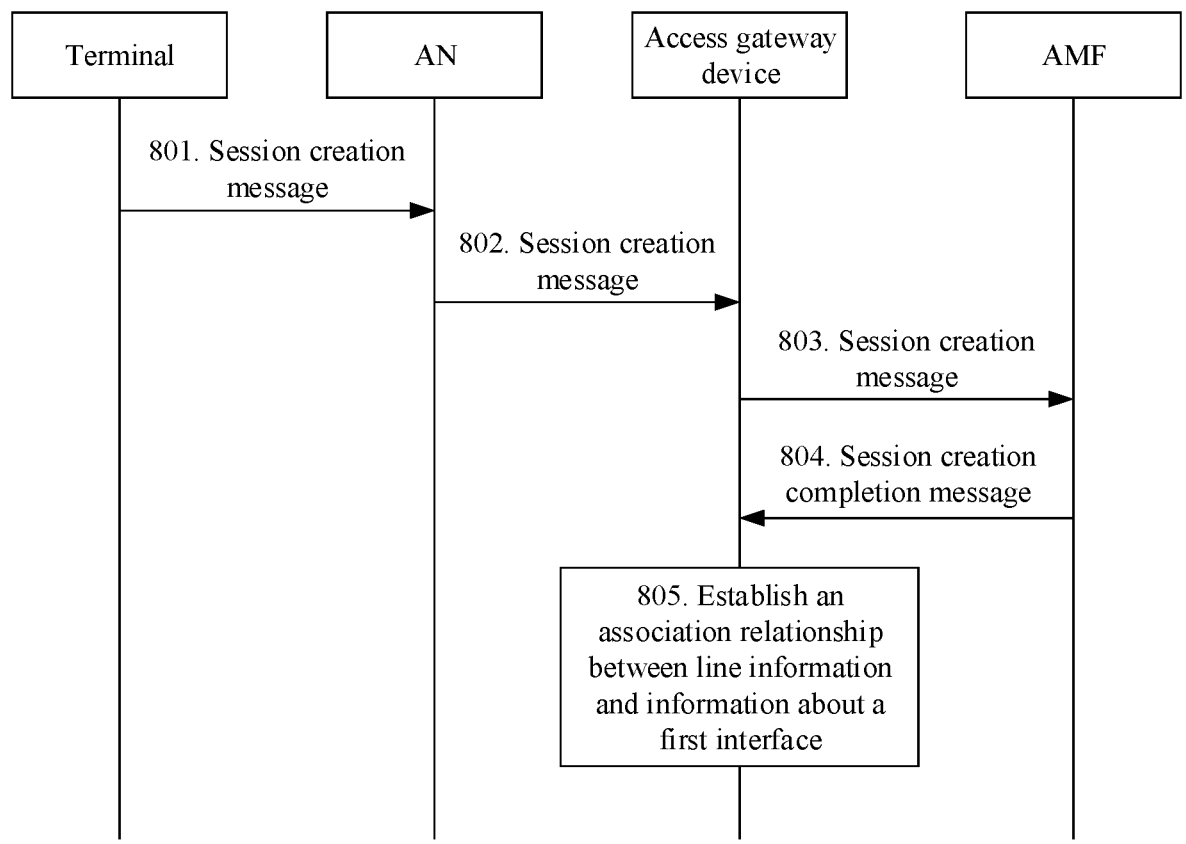
FIG. 6 is a method for determining fixed network session characteristic information according to at least an embodiment of this application.

FIG. 6 is a schematic diagram of a method, provided in this application, for establishing the association relationship between the line information and the information about the first interface. The method shown in FIG. 6 is performed after steps 701 to 704 and before steps 501 to 504.

Step 801: The terminal sends a session creation message to the AN, and the AN receives the session creation message from the terminal.

The session creation message is a NAS message. In some embodiments, the session creation message may be a PDU session creation message.

Step 802: The AN sends the session creation message to the access gateway device, and the access gateway device receives the session creation message from the AN.

To be specific, the AN does not obtain specific content of the session creation message, but forwards the received session creation message to the access gateway device.

Step 803: The access gateway device sends the session creation message to an AMF, and the AMF receives the session creation message from the access gateway device.

To be specific, the access gateway device does not obtain the specific content of the session creation message, but forwards the received session creation message to the AMF. In some embodiments, the access gateway device may add the session creation message to fixed network information or a message sent through an N2 interface, and forward the fixed network information or the message sent through the N2 interface to the AMF.

Step 804: The AMF sends a session creation completion message to the access gateway device, and the access gateway device receives the session creation completion message from the AMF.

After receiving the session creation message from the access gateway device, the AMF completes an operation related to session creation on a core network control plane, then sends the session creation completion message to the access gateway device through the N2 interface, and adds, to the session creation completion message, indication information used to instruct the access gateway device to create a session.

Further, the session creation completion message further includes tunnel information of a UPF, for example, includes a GTP-U and a TEID on a UPF side.

Step 805: The access gateway device establishes the association relationship between the line information and the information about the first interface.

In some embodiments, after receiving the indication information and the session creation completion message that are sent by the AMF through the N2 interface, the access gateway device creates the first interface based on the indication information, to obtain the information about the first interface. The information about the first interface includes generated tunnel information on an access gateway device side (for example, includes a GTP-U and a TEID on the access gateway device side), and further includes the tunnel information that is of the UPF and that is obtained from the session creation completion message.

It should be noted that the creation of the first interface is merely an embodiment. In some embodiments, alternatively, related information of the first interface may be created in advance. In this case, in this embodiment and other embodiments of this application, only the information about the first interface is obtained.

After obtaining the information about the first interface, the access gateway device further establishes the association relationship between the line information that is determined by using steps 701 to 704 and the information that is about the first interface and that is determined by using steps 801 to 806.

Therefore, in the foregoing method, steps 701 to 704 are first performed to determine the line information to be carried in the fixed network packet. Then, steps 801 to 805 are performed to establish the association relationship between the determined line information that is to be carried in the fixed network packet and the information about the first interface.

After the association relationship between the line information and the information about the first interface is established, the association relationship may be used subsequently, that is, steps 501 to 504 may be performed.

Referring to FIG. 6, in actual application, a plurality of sessions may be simultaneously created for one terminal, or sessions may be simultaneously created for a plurality of terminals. Therefore, steps 803 and 804 may be performed for a plurality of times between the access gateway and the AMF. To help the access gateway device distinguish between the plurality of simultaneously created sessions, and further to correctly establish the association relationship between the line information and the first interface, the line information may be carried in step 803 in this application. The line information is the line information determined by using steps 701 to 704. The line information carried in step 803 is associated with the session creation message sent in step 803, and is used to identify the session creation message. Further, the line information is also carried in step 804. To be specific, the line information is associated with the session creation completion message sent in step 804, and is used to identify the session creation completion message. Therefore, when receiving the session creation completion message and obtaining the tunnel information of the UPF in the session creation completion message in step 804, the access gateway device may determine that the tunnel information of the UPF is associated with the line information. Further, in step 805, the information about the first interface may be associated with the line information.

It should be noted that the session creation message mentioned in the foregoing embodiment and subsequent embodiments is used to request creation of a session. The session creation message is merely a name, and may be replaced by another name in actual application. For example, the session creation message may be replaced by the following names, including but not limited to: a message used to request creation of a session, a first message, a request message, a session request message, and a session creation request message, and the like.

Similarly, the session creation completion message mentioned in the foregoing embodiment and subsequent embodiments is used to indicate that the creation of a session is completed. The session creation completion message is also merely a name, and may also be replaced by another name in actual application. For example, the session creation completion message may be replaced by the following names, including but not limited to: a message used to indicate that the creation of a session is completed, a second message, a response message, a session completion indication message, and a session completion message, and the like.

Figure 7:
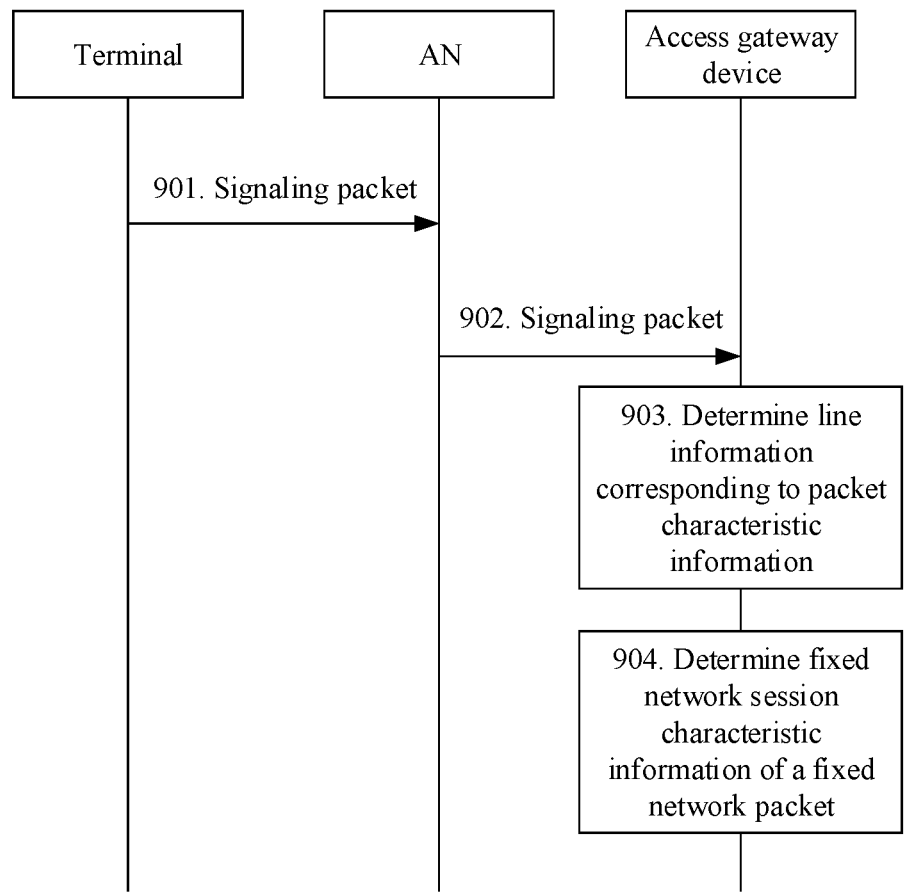
FIG. 7 is a method for determining fixed network session characteristic information according to at least an embodiment of this application.

In some embodiments for method 1, if the first fixed network session characteristic information is the packet characteristic information including one or more of a MAC address, VLAN information, and a session protocol type, method 1 may use a method shown in FIG. 7.

As shown in FIG. 7, a method for determining the fixed network session characteristic information includes the following steps:

Step 901: The terminal sends, to the AN, a signaling packet that is carried in the first fixed network session and that carries the packet characteristic information, and the AN receives the signaling packet from the terminal.

Step 902: The AN sends, to the access gateway device, the signaling packet that is carried in the first fixed network session and that carries the packet characteristic information, and the access gateway device receives the signaling packet from the AN.

Step 903: The access gateway device obtains the packet characteristic information from the signaling packet and determines the line information corresponding to the packet characteristic information.

Step 904: The access gateway device determines the determined line information as the fixed network session characteristic information of the fixed network packet.

By using the foregoing steps 901 to 904, the terminal adds the packet characteristic information to the signaling packet, and sends the signaling packet to the AN by using the first fixed network session. After receiving the signaling packet, the AN forwards the signaling packet to the access gateway device. Then, the access gateway device may directly obtain the packet characteristic information from the signaling packet, and determine the line information corresponding to the packet characteristic information based on the packet characteristic information.

Similarly, the method in steps 901 to 904 is performed before steps 501 to 504.

The line information determined by using the method in steps 901 to 904 is the line information that is to be inserted into the fixed network packet in the subsequent step 502. In other words, by using steps 901 to 904, the line information carried in the fixed network packet that is subsequently received by the access gateway device may be obtained.

After steps 901 to 904, then the association relationship between the line information and the information about the first interface is established. For details, refer to the procedure shown in FIG. 6. Details are not described again.

In conclusion, method 1 includes two methods for establishing the association relationship between the line information and the information about the first interface. One method is to first perform the procedure shown in FIG. 5 and then perform the procedure shown in FIG. 6. The other method is to first perform the procedure shown in FIG. 7 and then perform the procedure shown in FIG. 6.

Method 2: The access gateway device receives a signaling packet carried in a second fixed network session and obtains the link information from the signaling packet, where the signaling packet includes the link information. The access gateway device receives a session creation message including the virtual interface information and sends the session creation message to an AMF. The access gateway device receives the virtual interface information from the AMF. The access gateway device determines the fixed network session characteristic information based on the link information and the virtual interface information.

In method 2, the access gateway device obtains the link information from the signaling packet carried in the second fixed network session. Because the signaling packet is a packet carried in the second fixed network session, but the fixed network packets in steps 501 and 503 are carried in the first fixed network session, it may be determined that the link information obtained from the signaling packet is the same as the link information included in the line information in the fixed network packet. In addition, if the signaling packet further includes virtual interface information, the virtual interface information is different from the virtual interface information included in the line information in the fixed network packet. In other words, the link information may be obtained from the signaling packet, but the virtual interface information cannot be obtained from the signaling packet.

For the virtual interface information, the access gateway device forwards the received session creation message that carries the virtual interface information to the AMF, and the AMF obtains the virtual interface information from the session creation message and sends the virtual interface information to the access gateway device, so that the access gateway device can obtain the virtual interface information. Further, the access gateway device obtains the line information based on the link information and the virtual interface information, and determines that the line information is the line information carried in the fixed network packet in steps 501 to 504 that are to be subsequently performed.

For example, the following provides a process of the method 2.

Figure 8:
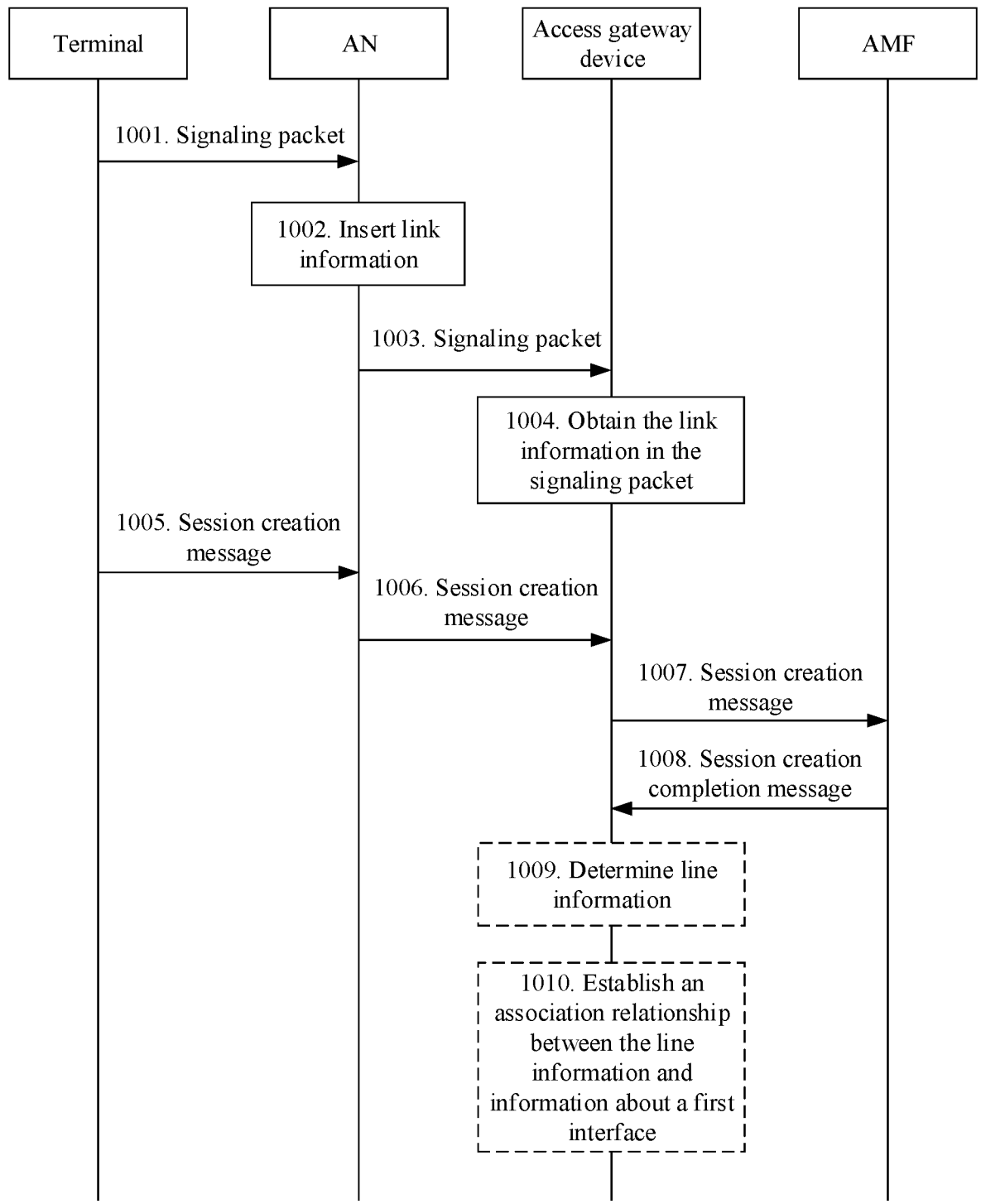
FIG. 8 is a method for determining fixed network session characteristic information according to at least an embodiment of this application.

As shown in FIG. 8, in the method 2, a specific method for determining the fixed network session characteristic information includes the following steps:

Step 1001: The terminal sends the signaling packet carried in the second fixed network session to the AN, and the AN receives the signaling packet from the terminal.

Step 1002: The AN inserts the link information into the received signaling packet.

In the foregoing step 1001, the signaling packet sent by the terminal to the AN is carried in the second fixed network session. However, in step 501, the signaling packet sent by the terminal to the AN is carried in the first fixed network session. For different fixed network sessions, link information is the same, but virtual interface information is different. Therefore, the link information inserted into the signaling packet by the AN in step 1002 is the same as the link information that is in the line information and that is inserted into the fixed network packet by the AN in step 502.

Step 1003: The AN sends, to the access gateway device, the signaling packet that is carried in the second fixed network session and that carries the link information, and the access gateway device receives the signaling packet from the AN.

Step 1004: The access gateway device obtains the link information in the signaling packet.

By using the foregoing steps 1001 to 1004, the access gateway device obtains the link information in the line information carried in the fixed network packet. Then, by using the following steps 1005 to 1009, the access gateway device obtains the virtual interface information in the line information carried in the fixed network packet.

Step 1005: The terminal sends the session creation message to the AN, and the AN receives the session creation message from the terminal.

The session creation message is a NAS message. In some embodiments, the session creation message may be a PDU session creation message.

The session creation message carries the virtual interface information, where the virtual interface information is the virtual interface information in the line information carried in the fixed network packet in the foregoing steps 501 to 504.

Step 1006: The AN sends the session creation message to the access gateway device, and the access gateway device receives the session creation message from the AN.

To be specific, the AN does not obtain specific content of the session creation message, but forwards the received session creation message to the access gateway device.

Step 1007: The access gateway device sends the session creation message to the AMF, and the AMF receives the session creation message from the access gateway device.

To be specific, the access gateway device does not obtain the specific content of the session creation message, but forwards the received session creation message to the AMF. In some embodiments, the access gateway device may add the session creation message to fixed network information or a message sent through an N2 interface, and forward the fixed network information or the message sent through the N2 interface to the AMF.

Step 1008: The AMF sends a session creation completion message to the access gateway device, and the access gateway device receives the session creation completion message from the AMF.

After receiving the session creation message from the access gateway device, the AMF completes an operation related to session creation on a core network control plane, and obtains the virtual interface information from the session creation message. Then, the AMF sends the session creation completion message to the access gateway device through the N2 interface, and adds, to the session creation completion message, the virtual interface information and indication information that is used to instruct the access gateway device to create a session.

Further, the session creation completion message further includes tunnel information that is of a UPF and that is obtained after the session is created, for example, includes a GTP-U and a TEID on a UPF side.

Step 1009: The access gateway device determines the line information based on the virtual interface information in the session creation completion message and the link information.

To be specific, the access gateway device combines the link information obtained by using the foregoing steps 1001 to 1004 and the virtual interface information obtained by using the foregoing steps 1005 to 1008, to obtain the line information. The line information is the line information carried in the fixed network packet in the foregoing steps 501 to 504.

By using the foregoing steps 1001 to 1009, the line information carried in the fixed network packet that is subsequently received by the access gateway device may be obtained.

In some embodiments, after step 1009, a step for establishing the association relationship between the line information and the information about the first interface is further included. The step is specifically as follows:

Step 1010: The access gateway device establishes the association relationship between the line information and the information about the first interface.

For details of step 1010, refer to the foregoing details in step 805. Details are not described herein again.

In conclusion, in method 2, steps 1001 to 1009 are first performed to determine the line information to be carried in the fixed network packet. Then, step 1010 is performed to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

Method 3: The access gateway device receives a signaling packet carried in a second fixed network session, where the signaling packet includes the link information. The access gateway device obtains the link information from the signaling packet and sends the link information to an AMF. The access gateway device receives a session creation message including the virtual interface information and sends the session creation message to the AMF. The access gateway device receives the fixed network session characteristic information from the AMF. The fixed network session characteristic information is the line information.

In the method 3, the access gateway device obtains the link information from the signaling packet carried in the second fixed network session. Because the signaling packet is a packet carried in the second fixed network session, but the fixed network packets in steps 501 and 503 are carried in the first fixed network session, it may be determined that the link information obtained from the signaling packet is the same as the link information included in the line information in the fixed network packet. In addition, if the signaling packet further includes virtual interface information, the virtual interface information is different from the virtual interface information included in the line information in the fixed network packet. In other words, the link information may be obtained from the signaling packet, but the virtual interface information cannot be obtained from the signaling packet. After obtaining the link information, the access gateway device sends the link information to the AMF.

For the virtual interface information, the access gateway device forwards the received session creation message that carries the virtual interface information to the AMF, and the AMF obtains the virtual interface information from the session creation message.

Further, the AMF obtains the line information based on the link information sent by the access gateway device and the virtual interface information obtained from the session creation message, and sends the line information to the access gateway device. The access gateway device determines that the line information is the line information carried in the fixed network packet in steps 501 to 504 that are to be subsequently performed.

For example, the following provides a process of the method 3.

Figure 9:
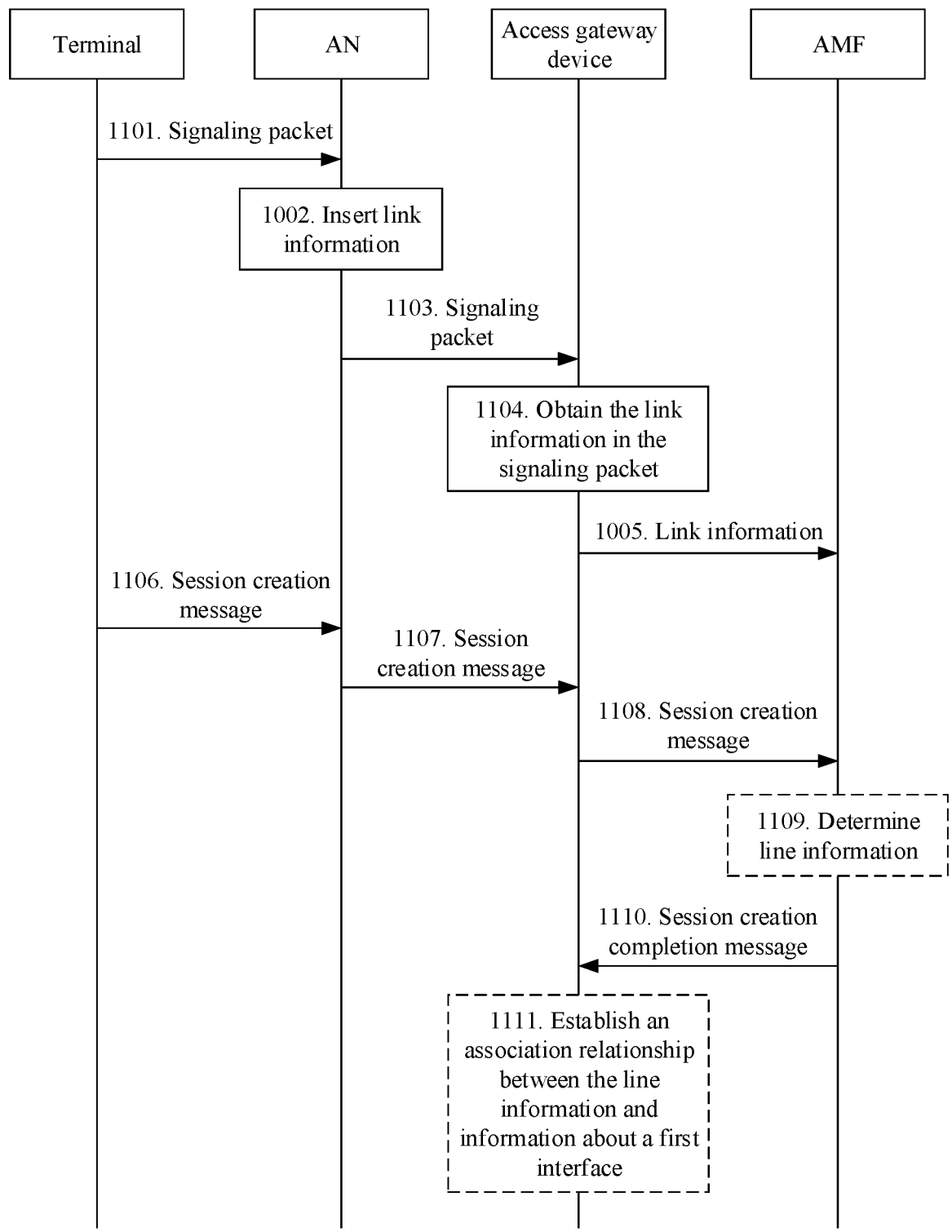
FIG. 9 is a method for determining fixed network session characteristic information according to at least an embodiment of this application.

As shown in FIG. 9, in method 3, a method for determining the fixed network session characteristic information includes the following steps:

Steps 1101 to 1104 are the same as the foregoing steps 1001 to 1004. Refer to the foregoing descriptions.

Step 1105: The access gateway device sends the link information to the AMF, and the AMF receives the link information from the access gateway device.

The AMF obtains the link information by using steps 1101 to 1105.

Steps 1106 to 1108 are the same as the foregoing steps 1005 to 1007. Refer to the foregoing descriptions.

The AMF obtains the virtual interface information by using steps 1106 to 1108.

Step 1109: The AMF determines the line information based on the virtual interface information in the session creation message and the link information, where the line information is the line information carried in the fixed network packet that is subsequently received by the access gateway device.

Step 1110: The AMF sends a session creation completion message to the access gateway device, and the access gateway device receives the session creation completion message from the AMF.

This step is roughly the same as step 1008, and a main difference lies in that, the session creation completion message carries the virtual interface information in step 1008, while the session creation completion message carries the line information in step 1110.

By using the foregoing steps 1101 to 1110, the access gateway device may determine the line information carried in the fixed network packet that is subsequently received by the access gateway device.

In some embodiments, after step 1110, a step for establishing the association relationship between the line information and the information about the first interface is further included. The step is specifically as follows:

Step 1111: The access gateway device establishes the association relationship between the line information and the information about the first interface.

For details of step 1111, refer to step 805. Details are not described herein again.

In conclusion, method 3, steps 1101 to 1110 are first performed to determine the line information to be carried in the fixed network packet. Then, step 1111 is performed to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

Method 4: The access gateway device receives a session creation message and sends the session creation message to an AMF, where the session creation message includes service information corresponding to the fixed network packet. The access gateway device receives the service information from the AMF. The access gateway device determines, from subscription data based on the service information, the fixed network session characteristic information that corresponds to the service information. The fixed network session characteristic information is the line information.

In method 4, the access gateway device receives the session creation message that is sent by the terminal and forwarded by the AN. The session creation message carries the service information corresponding to the fixed network packet to be sent by the terminal. The service information may also be referred to as service information of a session, for example, may be specifically service information of a PDU session. The service information may be a service type, for example, a data service or an internet protocol television (IPTV), or may be service-related information such as slice information. In addition, corresponding line information may be found in subscription information or subscription configuration based on the service information.

The service information carried in the session creation message is the service information corresponding to the fixed network packet, and the service information also corresponds to the line information. Therefore, the line information obtained from the service information also corresponds to the fixed network packet.

For example, the following provides a process of method 4.

Figure 10:
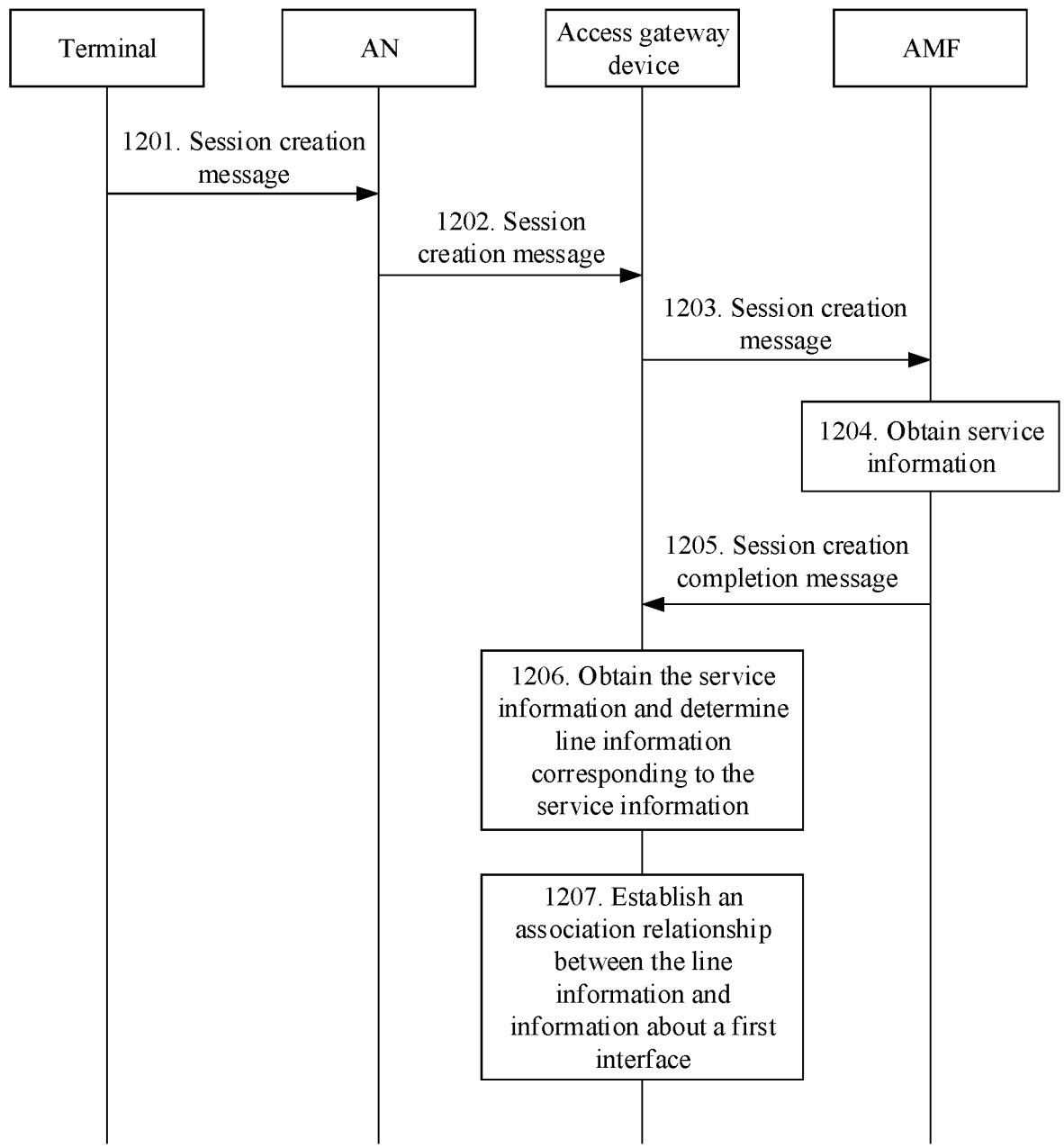
FIG. 10 is a method for determining fixed network session characteristic information according to at least an embodiment of this application.

As shown in FIG. 10, in method 4, a method for determining the fixed network session characteristic information includes the following steps:

Step 1201: The terminal sends the session creation message to the AN, and the AN receives the session creation message from the terminal.

The session creation message is a NAS message. In some embodiments, the session creation message may be a PDU session creation message.

The session creation message includes the service information corresponding to the fixed network packet.

Step 1202: The AN sends the session creation message to the access gateway device, and the access gateway device receives the session creation message from the AN.

To be specific, the AN does not obtain specific content of the session creation message, but forwards the received session creation message to the access gateway device.

Step 1203: The access gateway device sends the session creation message to the AMF, and the AMF receives the session creation message from the access gateway device.

To be specific, the access gateway device does not obtain the specific content of the session creation message, but forwards the received session creation message to the AMF. In some embodiments, the access gateway device may add the session creation message to fixed network information or a message sent through an N2 interface, and forward the fixed network information or the message sent through the N2 interface to the AMF.

Step 1204: The AMF obtains the service information from the session creation message.

Step 1205: The AMF sends a session creation completion message to the access gateway device, and the access gateway device receives the session creation completion message from the AMF.

After receiving the session creation message from the access gateway device, the AMF completes an operation related to session creation on a core network control plane, then sends the session creation completion message to the access gateway device through the N2 interface. The session creation completion message carries the service information and indication information that is used to instruct the access gateway device to create a session.

Further, the session creation completion message further includes tunnel information of a UPF, for example, includes a GTP-U and a TEID on a UPF side.

Step 1206: The access gateway device obtains the service information in the session creation completion message and determines the line information corresponding to the service information.

Specifically, the access gateway device determines, from the subscription data based on the service information, the line information corresponding to the service information. The line information is the line information carried in the fixed network packet in the foregoing steps 501 to 504.

In some embodiments, after step 1206, a step for establishing the association relationship between the line information and the information about the first interface is further included. The step is specifically as follows:

Step 1207: The access gateway device establishes the association relationship between the line information and the information about the first interface.

For details of step 1207, refer to step 80. Details are not described herein again.

In conclusion, in method 4, steps 1201 to 1206 are first performed to determine the line information to be carried in the fixed network packet. Then, step 1207 is performed to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

Method 5: The access gateway device receives a session creation message including service information corresponding to the fixed network packet. The access gateway device sends the session creation message to an AMF. The access gateway device receives the fixed network session characteristic information that corresponds to the service information and that is sent by the AMF. The fixed network session characteristic information is the line information.

In method 5, the access gateway device receives the session creation message that is sent by the terminal and forwarded by the AN. The session creation message carries the service information corresponding to the fixed network packet to be sent by the terminal. The service information may also be referred to as service information of a session, for example, may be specifically service information of a PDU session. The service information may be a service type, for example, a data service or an IPTV, or may be service-related information such as slice information. In addition, corresponding line information may be found in subscription information or subscription configuration based on the service information.

The service information carried in the session creation message is the service information corresponding to the fixed network packet, and the service information also corresponds to the line information. Therefore, the line information obtained from the service information also corresponds to the fixed network packet.

For example, the following provides a process of the method 5.

Figure 11:
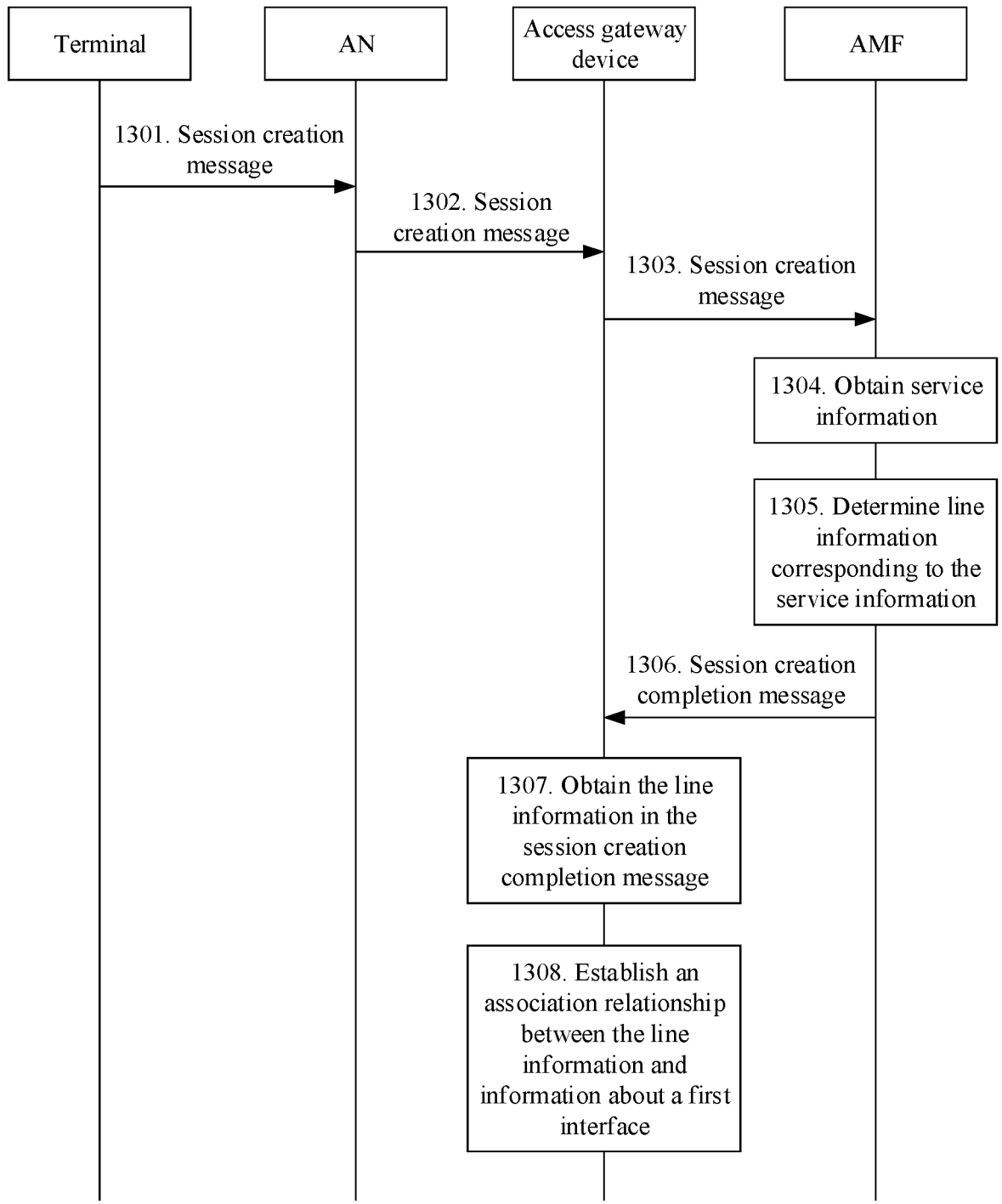
FIG. 11 is a method for determining fixed network session characteristic information according to at least an embodiment of this application.

As shown in FIG. 11, in method 5, a method for determining the fixed network session characteristic information includes the following steps:

Steps 1301 to 1304 are the same as the foregoing steps 1201 to 1204. Refer to the foregoing descriptions, and details are not described again.

Step 1305: The AMF determines the line information corresponding to the service information.

A method of step 1305 is the same as the method in which the access gateway device obtains the line information in step 1206. To be specific, the line information corresponding to the service information may be obtained from subscription data. The line information is the line information carried in the fixed network packet in the foregoing steps 501 to 504.

Step 1306: The AMF sends a session creation completion message to the access gateway device, and the access gateway device receives the session creation completion message from the AMF.

After receiving the session creation message from the access gateway device, the AMF completes an operation related to session creation on a core network control plane, then sends the session creation completion message to the access gateway device through an N2 interface. The session creation completion message carries the line information and indication information that is used to instruct the access gateway device to create a session.

Further, the session creation completion message further includes tunnel information of a UPF, for example, includes a GTP-U and a TEID on a UPF side.

Step 1307: The access gateway device obtains the line information in the session creation completion message.

In some embodiments, after step 1307, a step for establishing the association relationship between the line information and the information about the first interface is further included. The step is specifically as follows:

Step 1308: The access gateway device establishes the association relationship between the line information and the information about the first interface.

For details of step 1308, refer to the details in step 805. Details are not described herein again.

In conclusion, in method 5, steps 1301 to 1307 are first performed to determine the line information to be carried in the fixed network packet. Further, step 1308 is performed to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

Method 6: The access gateway device receives a signaling packet, where the signaling packet includes the link information. The access gateway device obtains the link information from the signaling packet. The access gateway device sends a request message to a resource management network element, where the request message includes the link information and is used to request allocation of a fixed network session resource. The access gateway device receives the virtual interface information from the resource management network element. The access gateway device determines the fixed network session characteristic information based on the link information and the virtual interface information. The fixed network session characteristic information is the line information.

In method 6, the access gateway device obtains the link information from the signaling packet sent by the terminal, and the link information is the same as the link information included in the line information in the fixed network packet. In addition, if the signaling packet further includes virtual interface information, the virtual interface information is different from the virtual interface information included in the line information in the fixed network packet. In other words, the link information may be obtained from the signaling packet, but the virtual interface information cannot be obtained from the signaling packet.

The virtual interface information is allocated by the resource management network element, and the resource management network element may be, for example, an ACRF (Access Control Resource Function) network element. Specifically, the access gateway device sends, to the resource management network element, the request message carrying the link information, and the request message is used to request the allocation of a fixed network session resource. After receiving the request message, the resource management network element allocates virtual interface information, and sends the virtual interface information to the access gateway device. The access gateway device may obtain the virtual interface information.

Further, the access gateway device obtains the line information based on the link information and the virtual interface information, and determines that the line information is the line information carried in the fixed network packet in steps 501 to 504 that are to be subsequently performed.

For example, the following provides a process of method 6.

Figure 12:
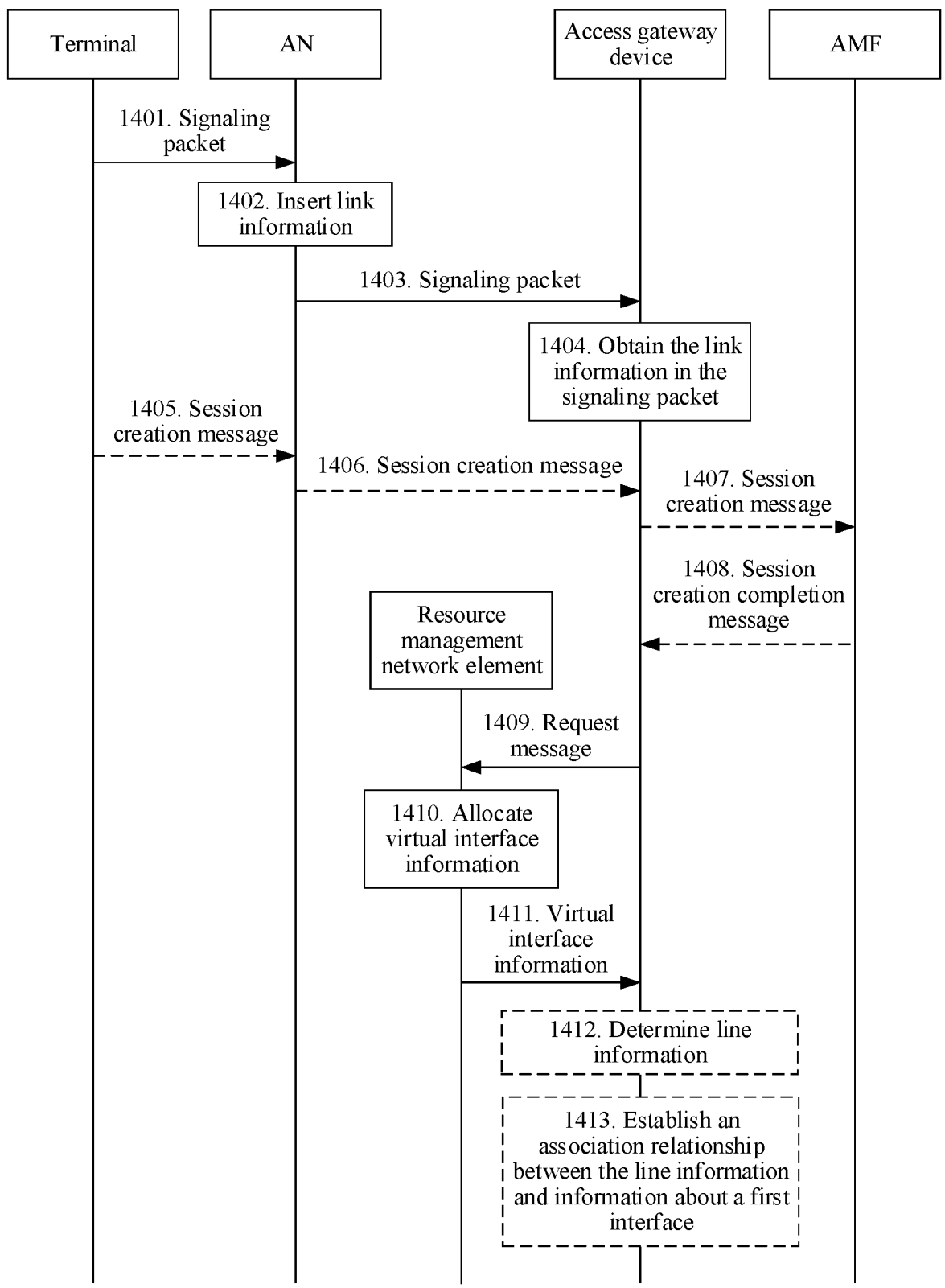
FIG. 12 is a method for determining fixed network session characteristic information according to at least an embodiment of this application.

As shown in FIG. 12, in method 6, a specific method for determining the fixed network session characteristic information includes the following steps:

Step 1401: The terminal sends the signaling packet to the AN, and the AN receives the signaling packet from the terminal.

Step 1402: The AN inserts the link information into the received signaling packet.

The link information inserted into the signaling packet by the AN in step 1402 is the same as the link information that is in the line information and that is inserted into the fixed network packet by the AN in step 502.

Step 1403: The AN sends, to the access gateway device, the signaling packet carrying the link information, and the access gateway device receives the signaling packet from the AN.

Step 1404: The access gateway device obtains the link information from the signaling packet.

By using the foregoing steps 1401 to 1404, the access gateway device obtains the link information in the line information carried in the fixed network packet. Then, by using the following steps 1405 to 1411, the access gateway device obtains the virtual interface information in the line information carried in the fixed network packet.

Step 1405: The terminal sends the session creation message to the AN, and the AN receives the session creation message from the terminal.

The session creation message is a NAS message. In some embodiments, the session creation message may be a PDU session creation message.

Step 1406: The AN sends the session creation message to the access gateway device, and the access gateway device receives the session creation message from the AN.

To be specific, the AN does not obtain specific content of the session creation message, but forwards the received session creation message to the access gateway device.

Step 1407: The access gateway device sends the session creation message to the AMF, and the AMF receives the session creation message from the access gateway device.

To be specific, the access gateway device does not obtain the specific content of the session creation message, but forwards the received session creation message to the AMF. In some embodiments, the access gateway device may add the session creation message to fixed network information or a message sent through an N2 interface, and forward the fixed network information or the message sent through the N2 interface to the AMF.

Step 1408: The AMF sends a session creation completion message to the access gateway device, and the access gateway device receives the session creation completion message from the AMF.

After receiving the session creation message from the access gateway device, the AMF completes an operation related to session creation on a core network control plane. Then, the AMF sends the session creation completion message to the access gateway device through the N2 interface, and adds, to the session creation completion message, indication information used to instruct the access gateway device to create a session.

Further, the session creation completion message further includes tunnel information that is of a UPF and that is obtained after the session is created, for example, includes a GTP-U and a TEID on a UPF side.

It should be noted that steps 1405 to 1408 are optional and mainly used to subsequently establish the association relationship between the line information and the information about the first interface.

Step 1409: The access gateway device sends the request message to the resource management network element, and the resource management network element receives the request message from the access gateway device.

The request message includes the link information.

Step 1410: The resource management network element allocates the virtual interface information.

Specifically, the resource management network element obtains the link information from the request message, and allocates the virtual interface information based on the link information. The virtual interface information is also the virtual interface information in the line information carried in the fixed network packet.

Step 1411: The resource management network element sends the virtual interface information to the access gateway device, and the access gateway device receives the virtual interface information from the resource management network element.

Step 1412: The access gateway device determines the line information based on the link information and the virtual interface information.

To be specific, the access gateway device combines the link information obtained by using the foregoing steps 1401 to 1404 and the virtual interface information obtained by using the foregoing steps 1409 to 1411, to obtain the line information. The line information is the line information carried in the fixed network packet in the foregoing steps 501 to 504.

By using the foregoing steps 1401 to 1412, the line information carried in the fixed network packet that is subsequently received by the access gateway device may be obtained.

In some embodiments, after step 1412, a step for establishing the association relationship between the line information and the information about the first interface is further included. The step is specifically as follows:

Step 1413: The access gateway device establishes the association relationship between the line information and the information about the first interface.

For details of step 1413, refer to the foregoing details in step 805. Details are not described herein again.

In conclusion, in method 6, steps 1401 to 1412 are first performed to determine the line information to be carried in the fixed network packet. Then, step 1413 is performed to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

Method 7: The access gateway device receives a signaling packet, where the signaling packet includes the link information. The access gateway device obtains the link information from the signaling packet. The access gateway device receives the virtual interface information that is sent by the terminal through a second interface, where the second interface is an interface between the terminal and the access gateway device. The access gateway device determines the fixed network session characteristic information based on the link information and the virtual interface information. The fixed network session characteristic information is the line information.

In method 7, the access gateway device obtains the link information from the signaling packet sent by the terminal, and the link information is the same as the link information included in the line information in the fixed network packet. In addition, if the signaling packet further includes virtual interface information, the virtual interface information is different from the virtual interface information included in the line information in the fixed network packet. In other words, the link information may be obtained from the signaling packet, but the virtual interface information cannot be obtained from the signaling packet.

The virtual interface information is sent by the terminal to the access gateway device through the second interface between the terminal and the access gateway device.

Further, the access gateway device obtains the line information based on the link information and the virtual interface information, and determines that the line information is the line information carried in the fixed network packet in steps 501 to 504 that are to be subsequently performed.

For example, the following provides a process of method 7.

Figure 13:
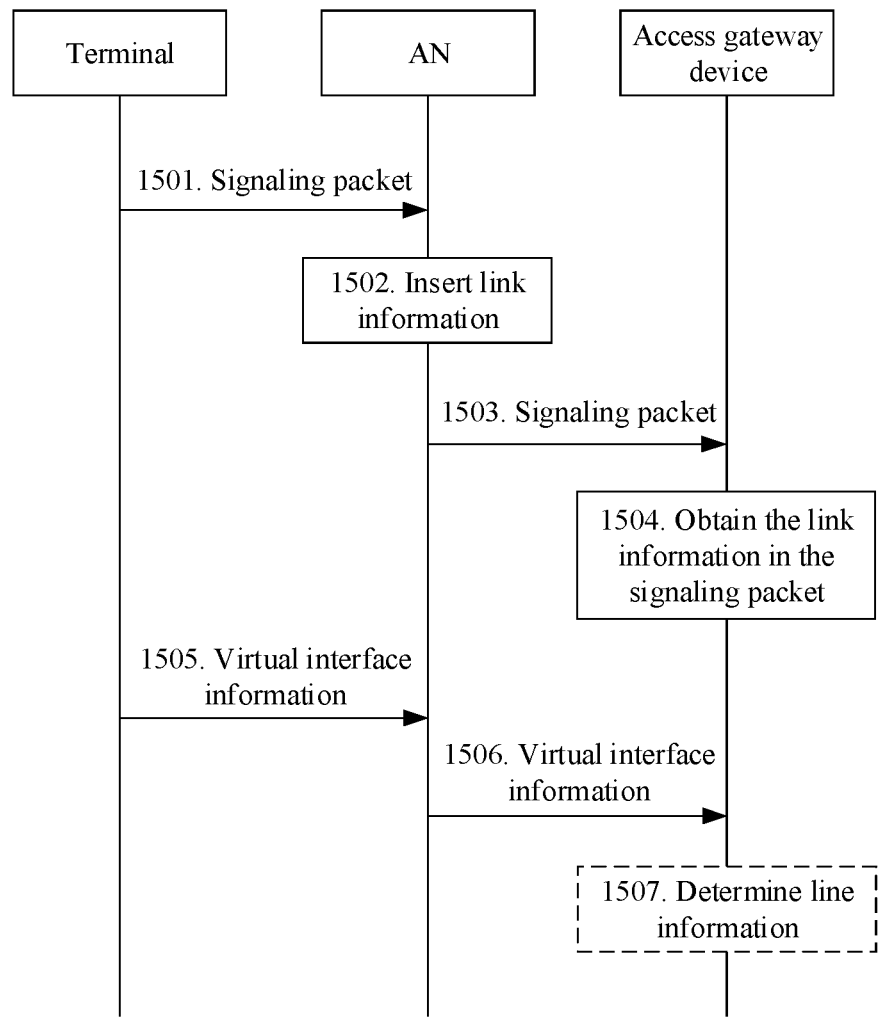
FIG. 13 is a method for determining fixed network session characteristic information according to at least an embodiment of this application.

As shown in FIG. 13, in method 7, a specific method for determining the fixed network session characteristic information includes the following steps:

Steps 1501 to 1504 are the same as the foregoing steps 1401 to 1404. Refer to the foregoing descriptions.

Step 1505: The terminal sends the virtual interface information to the AN, and the AN receives the virtual interface information from the terminal.

For example, the virtual interface information is carried in the signaling packet, and the signaling packet is sent through the second interface.

Step 1506: The AN sends the virtual interface information to the access gateway device, and the access gateway device receives the virtual interface information from the AN.

It should be noted that the AN does not obtain the virtual interface information. For example, when the virtual interface information is carried in the signaling packet, the AN forwards the signaling packet to the access gateway device.

Step 1507: The access gateway device determines the line information based on the link information and the virtual interface information.

To be specific, the access gateway device combines the link information obtained by using the foregoing steps 1501 to 1504 and the virtual interface information obtained by using the foregoing steps 1505 to 1407, to obtain the line information. The line information is the line information carried in the fixed network packet in the foregoing steps 501 to 504.

By using the foregoing steps 1501 to 1507, the line information carried in the fixed network packet that is subsequently received by the access gateway device may be obtained.

In some embodiments, with reference to the foregoing steps 1501 to 1507, a step for establishing the association relationship between the line information and the information about the first interface is further included. For example, steps 1405 to 1408 and step 1413 in FIG. 12 are added by the foregoing step 1501 and step 1507. Therefore, the association relationship between the line information and the information about the first interface may be established.

In conclusion, in method 7, steps 1501 to 1507 are performed to determine the line information to be carried in the fixed network packet. Further, steps 1405 to 1408 and step 1413 in FIG. 12 may be combined to establish the association relationship between the determined line information that is to be carried in the fixed network packet and the information about the first interface.

After the association relationship between the line information and the information about the first interface is established, the association relationship may be used subsequently, that is, the foregoing steps 501 to 504 may be performed.

In actual application, a plurality of sessions may be simultaneously created for one terminal, or sessions may be simultaneously created for a plurality of terminals. Therefore, when steps 1405 to 1408 and step 1413 in FIG. 12 are added to steps 1501 to 1507, steps 1501 to 1507 are performed for a plurality of times.

To help the access gateway device distinguish between the plurality of simultaneously created sessions, and further to correctly establish the association relationship between the line information and the first interface, in this application, the access gateway device may establish a correspondence between the fixed network session characteristic information (the line information) and identification information. The identification information is used to identify a to-be-created session. When sending a session creation message to an AMF, the access gateway device sends the identification information together with the session creation message. The session creation message is associated with the identification information. The access gateway device receives a session creation completion message sent by the AMF, where the session creation completion message includes tunnel information of a UPF and is associated with the identification information. Therefore, the access gateway device may obtain the tunnel information of the UPF from the session creation completion message based on the correspondence between the fixed network session characteristic information and the identification information. Further, the access gateway device generates tunnel information of the access gateway device based on the tunnel information of the UPF. Further, the access gateway device establishes the association relationship between the line information and the information about the first interface. The information about the first interface includes the tunnel information of the UPF and the tunnel information of the access gateway device. Therefore, the information about the first interface can be correctly associated with the line information.

Case 2: The fixed network session characteristic information that is carried in the fixed network packet and that is received by the access gateway device is the packet characteristic information.

Method 1: The access gateway device receives the characteristic information that is sent by the terminal through a second interface, where the second interface is an interface between the terminal and the access gateway device. The fixed network session characteristic information is the packet characteristic information.

In method 1, the terminal sends the packet characteristic information to the access gateway device through the second interface between the terminal and the access gateway device. Therefore, the access gateway device may obtain the packet characteristic information.

For example, the following provides a process of method 1.

Figure 14:
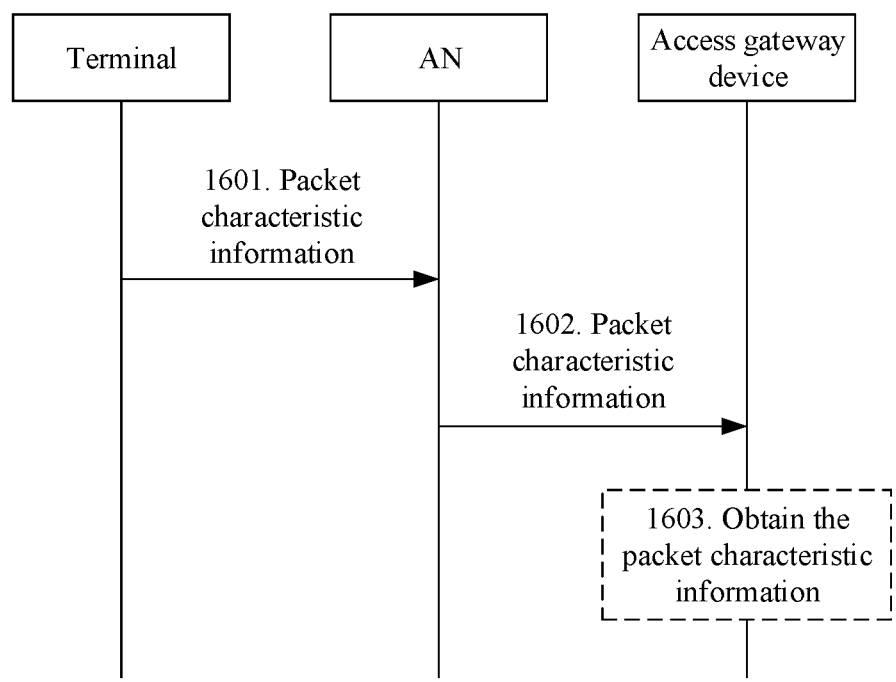
FIG. 14 is a method for determining fixed network session characteristic information according to at least an embodiment of this application.

As shown in FIG. 14, in method 1, a method for determining the fixed network session characteristic information includes the following steps:

Step 1601: The terminal sends the packet characteristic information to the AN, and the AN receives the packet characteristic information from the terminal.

For example, the packet characteristic information is carried in a signaling packet, and the signaling packet is sent through the second interface.

Step 1602: The AN sends the packet characteristic information to the access gateway device, and the access gateway device receives the packet characteristic information from the AN.

It should be noted that the AN does not obtain the packet characteristic information. For example, when the packet characteristic information is carried in the signaling packet, the AN forwards the signaling packet to the access gateway device.

Step 1603: The access gateway device obtains the packet characteristic information.

By using the foregoing steps 1601 to 1603, the packet characteristic information carried in the fixed network packet that is subsequently received by the access gateway device may be obtained.

In some embodiments, with reference to the foregoing steps 1601 to 1603, a step for establishing an association relationship between the packet characteristic information and the information about the first interface is further included. For example, steps 1405 to 1408 and step 1413 in FIG. 12 are added between the foregoing step 1601 and step 1603. Therefore, the association relationship between the packet characteristic information and the information about the first interface may be established.

It should be noted that when steps 1405 to 1408 and step 1413 in FIG. 12 are added by the foregoing step 1601 and step 1603, step 1413 is modified as follows: The access gateway device establishes the association relationship between the packet characteristic information and the information about the first interface.

In conclusion, in method 1, steps 1601 to 1603 are performed to determine the packet characteristic information to be carried in the fixed network packet. Further, steps 1405 to 1408 and step 1413 in FIG. 12 may be combined to establish the association relationship between the determined packet characteristic information that is to be carried in the fixed network packet and the information about the first interface.

After the association relationship between the packet characteristic information and the information about the first interface is established, the association relationship may be used subsequently, that is, the foregoing steps 601 to 603 may be performed.

In some embodiments, in any one of the foregoing embodiments, when receiving, from the terminal, an identifier of an IP obtaining mode that is a PPPoE, the access gateway device may allocate a PPPoE session identifier to the terminal, and send the PPPoE session identifier to an AMF. The AMF sends the PPPoE session identifier to an SMF, and the SMF sends the PPPoE session identifier to a UPF.

With reference to several specific embodiments, the following describes in detail the foregoing process of determining the fixed network packet characteristic information, establishing the association relationship between the fixed network packet characteristic information and the information about the first interface, and using the association relationship.

In the following embodiments 1 to 3, examples in which the terminal is an RG, the access gateway device is an AGF, and a user plane function network element is a UPF are used for description. In addition, a process of creating a PDU session is used as an example.

Embodiment 1 is a process of an embodiment obtained by combining FIG. 5, FIG. 6, and FIG. 3.

Figure 15A:
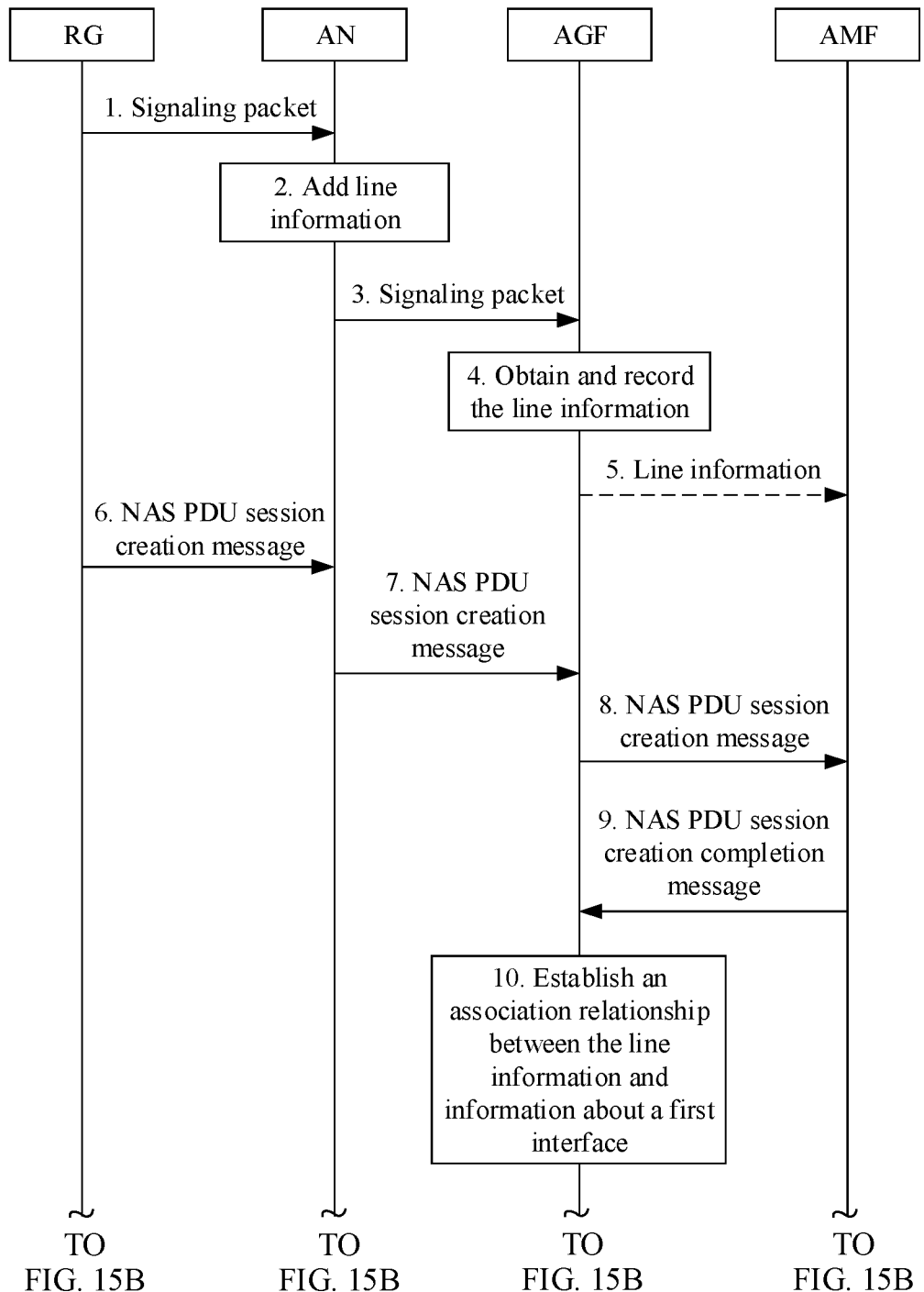
FIG. 15A and FIG. 15B are a fixed network packet sending method according to at least an embodiment of this application.
Figure 15B:
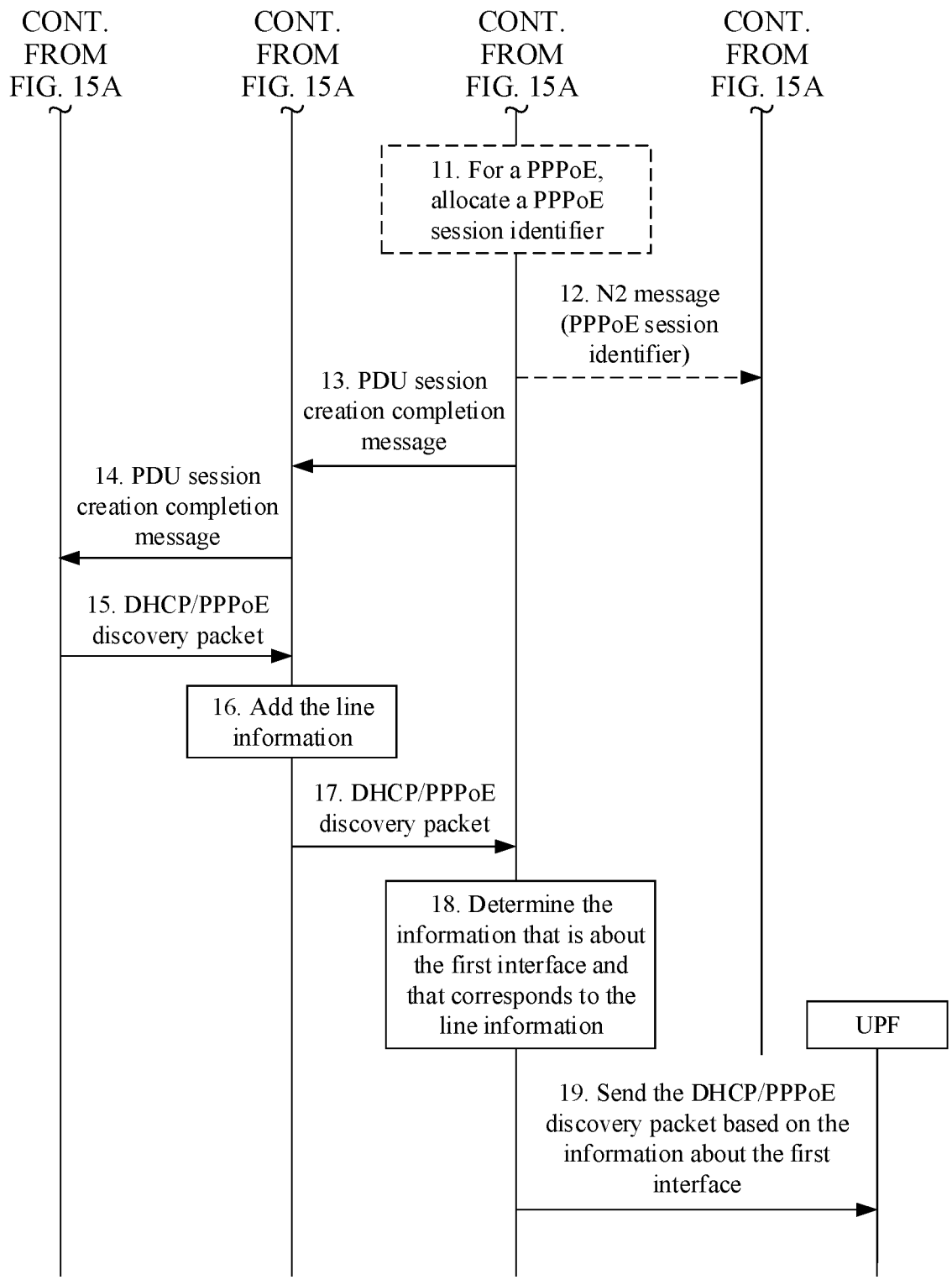

FIG. 15A and FIG. 15B are a fixed network packet sending method in Embodiment 1. The method includes the following steps:

Step 1: An RG sends a signaling packet carried in a first fixed network session to an AN.

Step 1 may also be described as follows: The RG sends the signaling packet in the first fixed network session.

Step 2: The AN adds line information to the signaling packet after receiving the signaling packet sent by the RG.

The line information includes link information and virtual interface information of the first fixed network session.

Step 3: The AN sends a signaling packet carried in the first fixed network session to an AGF.

Step 3 may also be described as follows: The RG sends, in the first fixed network session, a signaling packet including the line information.

Step 4: The AGF obtains and records the line information after receiving the signaling packet including the line information.

Step 5: The AGF sends the line information to an AMF through an N2 interface.

Step 5 is optional.

It should be noted that the foregoing steps 1 to 5 are not limited to a specific interaction procedure of a fixed network, for example, may be performed before or during session creation. That the AN adds the line information to the signaling packet is not limited to only one specific interaction process. Alternatively, the line information may be added to a plurality of or even all signaling packets.

Step 6: The RG sends a NAS PDU session creation message to the AN.

In some embodiments, the NAS PDU session creation message further includes an identifier of an IP obtaining mode. For example, the identifier of the IP obtaining mode is a DHCP, a PPPoE, or the like.

Step 7: The AN forwards the received RNAS PDU session creation message to the AGF.

Step 8: The AGF forwards the NAS PDU session creation message to the AMF through the N2 interface.

In some embodiments, to distinguish between created PDU sessions, when the NAS PDU session creation message is sent in step 8, the line information may also be sent together to the AMF, where the line information is used to identify the PDU session.

It should be noted that, if step 3 is performed, the line information is not sent in step 8. If step 3 is not performed, the line information may be sent in step 8. To be specific, when the line information is sent to the AMF, the line information may alternatively be sent in step 3 or step 8.

Step 9: After completing an operation related to PDU session creation, the AMF sends a NAS PDU session creation completion message to the AGF through the N2 interface.

In addition, an N2 message further instructs the AGF to create a PDU session.

If the line information is sent to the AMF in step 3 or step 6, the line information is also carried in step 9 and is used to identify the PDU session.

By sending the line information to the AMF, when the RG simultaneously initiates a plurality of PDU session creation requests, the AGF uses the line information as a part of content sent through the N2 interface. Therefore, the line information may be used as an identifier of current PDU session creation. Therefore, different PDU sessions can be distinguished.

Step 10: The AGF establishes an association relationship between the line information and information about a first interface.

Table 1 is an implementation of establishing the association relationship between the line information and the information about the first interface.

TABLE 1

| Fixed network side Line information | Information about the first interface IP address of a GTP-U and a TEID of the GTP-U |
|---|---|

The information about the first interface is the IP address of the GTP-U and the TEID of the GTP-U. Step 9 is optional. If a user obtains an IP address by using the PPPoE, In some embodiments, the AGF allocates a PPPoE session identifier to the user.

Step 11: For the PPPoE, the AGF allocates the PPPoE session identifier.

Step 11 is optional. For example, when the IP obtaining mode carried in step 6 is the PPPoE, step 11 may be performed in a scenario in which the PPPoE is terminated at the UPF.

Step 12: The AGF sends the PPPoE session identifier to the AMF through the N2 message.

Step 12 is optional. When step 11 is performed, step 12 is also performed.

In steps 11 and 12, the PPPoE session identifier is allocated by the AGF, and then is sent by the AGF to the AMF, by the AMF to an SMF, and by the SMF to a UPF. Therefore, the PPPoE session identifier may be used by the UPF to perform or remove PPPoE encapsulation.

Step 13: The AGF sends a PDU session creation completion message to the AN.

Step 14: The AN sends the PDU session creation completion message to the RG.

Step 15: The RG sends a PPPoE discovery packet or a DHCP discovery packet by using the first fixed network session.

The PPPoE discovery packet or the DHCP discovery packet is an implementation of the fixed network packet mentioned in the foregoing embodiments.

Step 16: The AN adds the line information to the received PPPoE discovery packet or the received DHCP discover packet.

Step 17: The AN sends a PPPoE discovery packet including the line information or a DHCP discovery packet including the line information to the AGF.

Step 18: The AGF determines, based on the mapping relationship established in step 10, the information that is about the first interface and that corresponds to the line information in the PPPoE discovery packet or the DHCP discovery packet.

Step 19: The AGF sends the PPPoE discovery packet or the DHCP discovery packet to the UPF based on the determined information about the first interface.

In Embodiment 1, the signaling packet and the PPPoE/DHCP discovery packet are transmitted based on a same fixed network session (namely, the first fixed network session). A correspondence between the line information and the information about the first interface is established by the AGF. When the line information is obtained from the PPPoE discovery packet or the DHCP discovery packet, the information about the corresponding first interface may be determined based on the line information. Then, the PPPoE discovery packet or the DHCP discovery packet is correctly forwarded to the UPF based on the information about the first interface.

Embodiment 2

Embodiment 2 may be a process of an embodiment obtained by combining FIG. 8 and FIG. 3, and may further be a process of an embodiment obtained by combining FIG. 9 and FIG. 3.

Figure 16A:
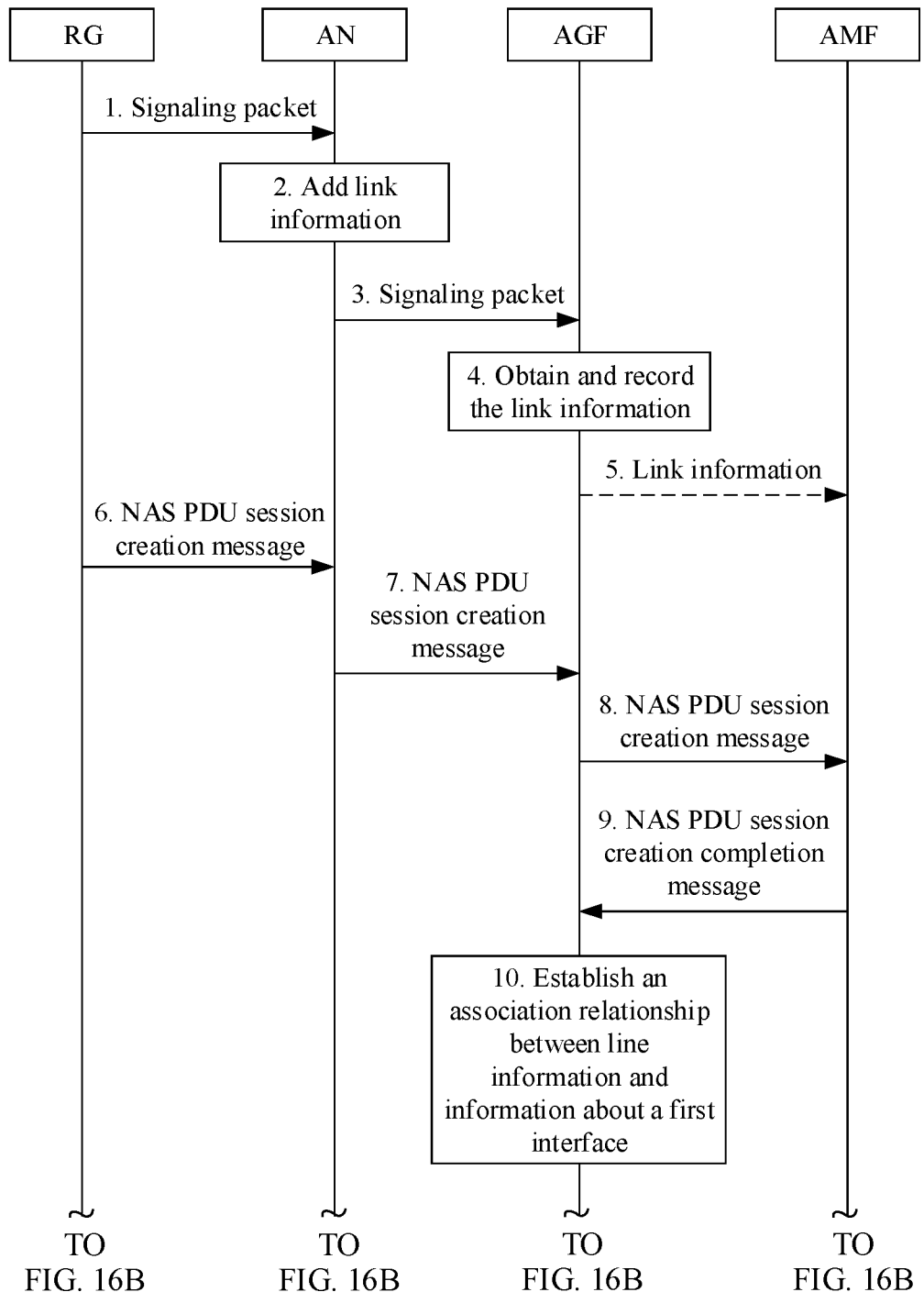
FIG. 16A and FIG. 16B are a fixed network packet sending method according to at least an embodiment of this application.
Figure 16B:
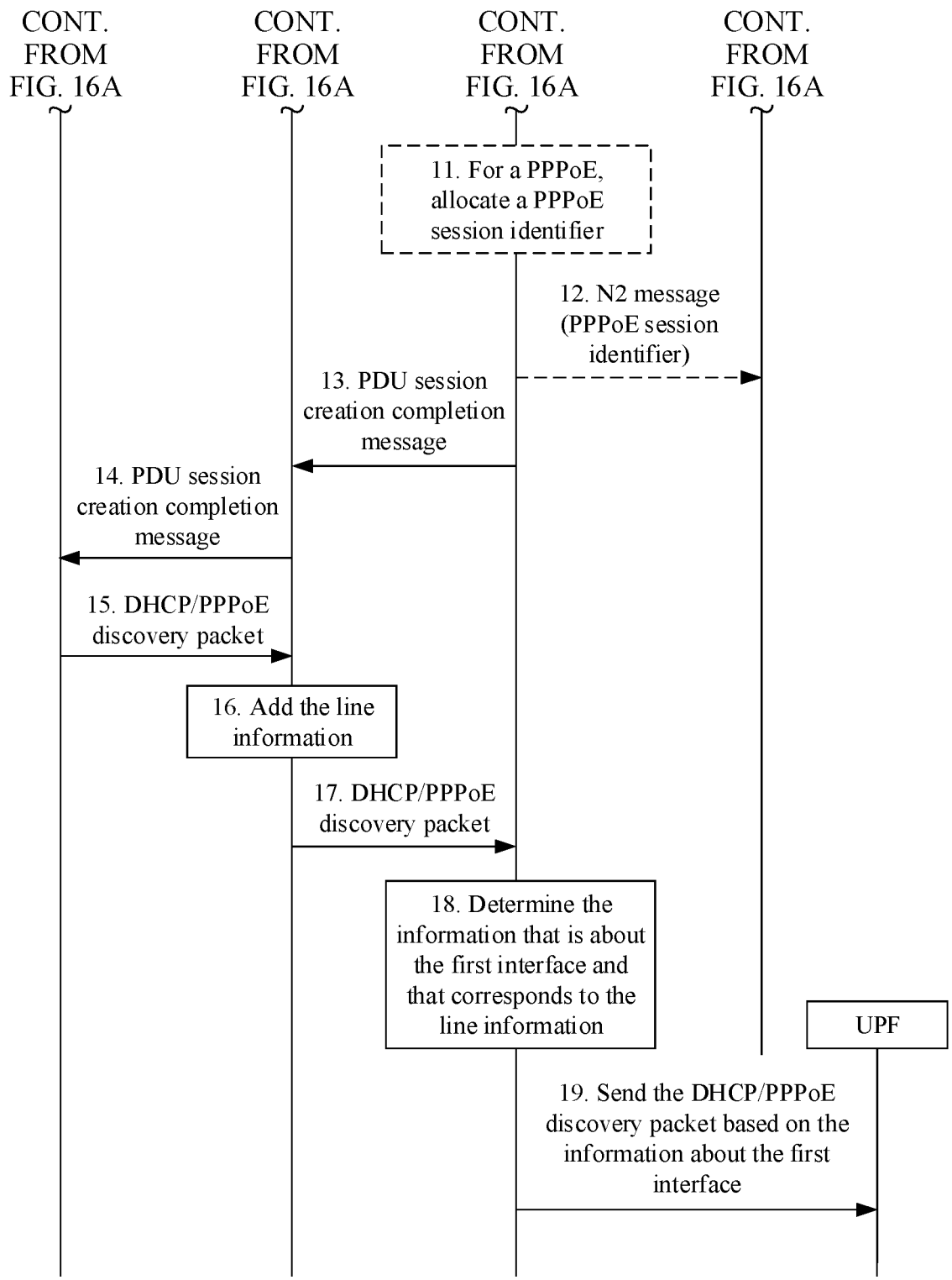

FIG. 16A and FIG. 16B are a fixed network packet sending method in Embodiment 2. The method includes the following steps:

Step 1: An RG sends a signaling packet carried in a second fixed network session to an AN.

Step 1 may also be described as follows: The RG sends the signaling packet in the second fixed network session.

Step 2: The AN adds link information to the signaling packet after receiving the signaling packet sent by the RG.

Step 3: The AN sends a signaling packet carried in the second fixed network session to an AGF.

Step 3 may also be described as follows: The RG sends, in the second fixed network session, a signaling packet including line information.

Step 4: The AGF obtains and records the line information after receiving the signaling packet including the link information.

Step 5: The AGF sends the link information to an AMF through an N2 interface.

Step 5 is optional.

Step 6: The RG sends a NAS PDU session creation message to the AN.

The NAS PDU session creation message includes virtual interface information of a first fixed network session.

In some embodiments, the NAS PDU session creation message further includes an identifier of an IP obtaining mode. For example, the identifier of the IP obtaining mode is a DHCP, a PPPoE, or the like.

Step 7: The AN forwards the received RNAS PDU session creation message to the AGF.

Step 8: The AGF forwards the NAS PDU session creation message to the AMF through the N2 interface.

In some embodiments, to distinguish between created PDU sessions, when the NAS PDU session creation message is sent in step 8, the link information may also be sent together to the AMF. By combining the link information with the virtual interface information in the NAS PDU session creation message, the line information is obtained, where the line information is used to identify the PDU session.

It should be noted that, if step 3 is performed, the link information is not sent in step 8. If step 3 is not performed, the link information may be sent in step 8. To be specific, when the link information is sent to the AMF, the link information may alternatively be sent in step 3 or step 8.

Step 9: After completing an operation related to PDU session creation, the AMF sends a NAS PDU session creation completion message to the AGF through the N2 interface.

The NAS PDU session creation completion message may include the virtual interface information, so that the AGF may obtain the virtual interface information from the NAS PDU session creation completion message. Therefore, the AGF may obtain the line information based on the link information obtained in step 4 and the link information obtained in step 9. Alternatively, the NAS PDU session creation completion message includes the line information, and the line information is determined by the AMF based on the link information obtained in step 5 or step 8 and the link information obtained in step 8.

In addition, an N2 message further instructs the AGF to create a PDU session.

If the line information is sent to the AMF in step 3 or step 6, the line information is also carried in step 9 and is used to identify the PDU session.

By sending the line information to the AMF, when the RG simultaneously initiates a plurality of PDU session creation requests, the AGF uses the line information as a part of content sent through the N2 interface. Therefore, the line information may be used as an identifier of current PDU session creation. Therefore, different PDU sessions can be distinguished.

Steps 10 to 19 are the same as steps 10 to 19 in Embodiment 1. Refer to the foregoing descriptions.

In Embodiment 2, the signaling packet (the second fixed network session) and a PPPoE/DHCP discovery packet are transmitted based on different fixed network sessions. A correspondence between the line information and information about a first interface is established by the AGF. When the line information is obtained from the PPPoE discovery packet or the DHCP discovery packet, the information about the corresponding first interface may be determined based on the line information. Then, the PPPoE discovery packet or the DHCP discovery packet is correctly forwarded to a UPF based on the information about the first interface.

Embodiment 3

Embodiment 2 may be a process of an embodiment obtained by combining FIG. 10 and FIG. 3, and may also be a implementation process of an embodiment obtained by combining FIG. 11 and FIG. 3.

Figure 17:
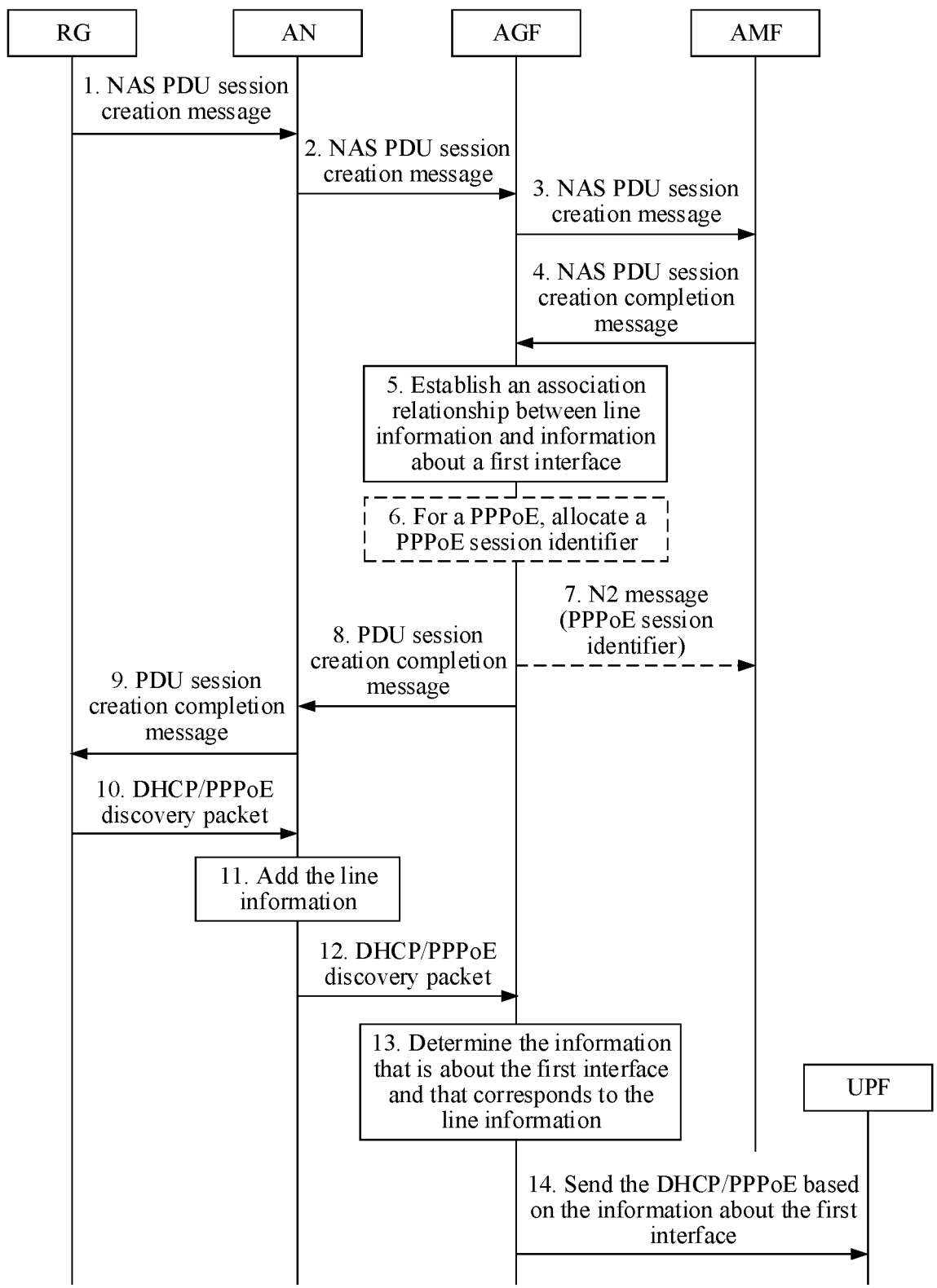
FIG. 17 is a fixed network packet sending method according to at least an embodiment of this application.

FIG. 17 is a fixed network packet sending method in Embodiment 3. The method includes the following steps:

Step 1: An RG sends a NAS PDU session creation message to an AN.

The NAS PDU session creation message includes service information. The service information may be a service type, for example, a data service or an IPTV, or may be service-related information such as slice information. Corresponding line information may be found in subscription information or subscription configuration based on the service information.

In some embodiments, the NAS PDU session creation message further includes an identifier of an IP obtaining mode. For example, the identifier of the IP obtaining mode is a DHCP, a PPPoE, or the like.

Step 2: The AN forwards the received NAS PDU session creation message to an AGF.

Step 3: The AGF forwards the NAS PDU session creation message to an AMF through an N2 interface.

Step 4: After completing an operation related to PDU session creation, the AMF sends a NAS PDU session creation completion message to the AGF through the N2 interface.

The NAS PDU session creation completion message may include the service information, so that the AGF may obtain the service information from the NAS PDU session creation completion message. Therefore, the AGF may obtain the corresponding line information from the subscription information or the subscription configuration based on the service information. Alternatively, the NAS PDU session creation completion message includes the line information, and the line information is obtained from the subscription information or the subscription configuration based on the service information by the AMF.

In addition, an N2 message further instructs the AGF to create a PDU session.

Steps 5 to 14 are the same as steps 10 to 19 in Embodiment 1. Refer to the foregoing descriptions.

In Embodiment 3, the line information is determined by using the service information. A correspondence between the line information and information about a first interface is established by the AGF. When the line information is obtained from a PPPoE discovery packet or a DHCP discovery packet, the information about the corresponding first interface may be determined based on the line information. Then, the PPPoE discovery packet or the DHCP discovery packet is correctly forwarded to a UPF based on the information about the first interface.

Figure 18:
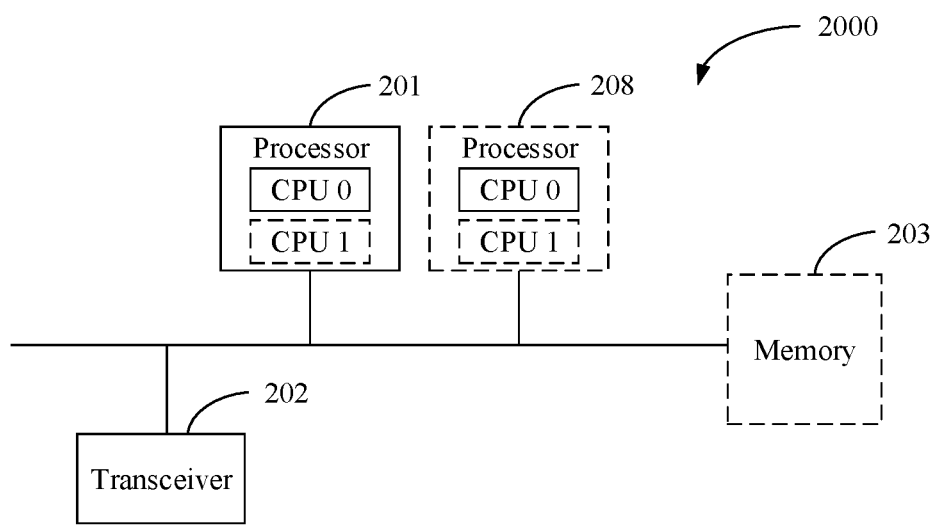
FIG. 18 is a schematic diagram of an apparatus according to at least an embodiment of this application.

Based on a same inventive concept, FIG. 18 is a schematic diagram of an apparatus according to this application. The apparatus may be an access gateway device and may perform the method performed by the access gateway device in any one of the foregoing embodiments.

An access gateway device 2000 includes at least one processor 201 and a transceiver 202. In some embodiments, the access gateway device 2000 further includes a memory 203. The processor 201, the transceiver 202, and the memory 203 are connected by using a communications line.

The processor 201 may be a general-purpose central processing unit (CPU), a microprocessor, an application-specific integrated circuit (ASIC), or one or more integrated circuits configured to control program execution in the solutions of the present disclosure.

The communications line may include a path for transmitting information between the foregoing units.

The transceiver 202 is configured to communicate with another device or a communications network. The transceiver includes a radio frequency circuit.

The memory 203 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory 203 may exist independently, and is connected to the processor 201 by using the communications line. Alternatively, the memory 203 may be integrated into the processor. The memory 203 is configured to store application program code for performing the solutions in the present disclosure, where the application program code is executed under control of the processor 201. The processor 201 is configured to execute the application program code stored in the memory 203.

In some embodiments, in an embodiment, the processor 201 may include one or more CPUs, for example, a CPU 0 and a CPU 1 shown in FIG. 18.

In some embodiments, in an embodiment, the access gateway device 2000 may include a plurality of processors, for example, the processor 201 and a processor 208 in FIG. 18. Each of the processors may be a single-core (single-CPU) processor, or may be a multi-core (multi-CPU) processor. Herein, the processor may be one or more devices, circuits, and/or processing cores for processing data (for example, a computer program instruction).

It should be understood that the access gateway device may be configured to implement the steps performed by the access gateway device in the methods in the embodiments of the present disclosure. For related features, refer to the foregoing descriptions. Details are not described herein again. In some embodiments, the actions of the access gateway device in FIG. 1 to FIG. 19 may be performed by the processor 201 (and/or 208) in the communications device 2000 shown in FIG. 18 by invoking the application program code stored in the memory 203. This is not limited in this embodiment of this application.

Figure 19:
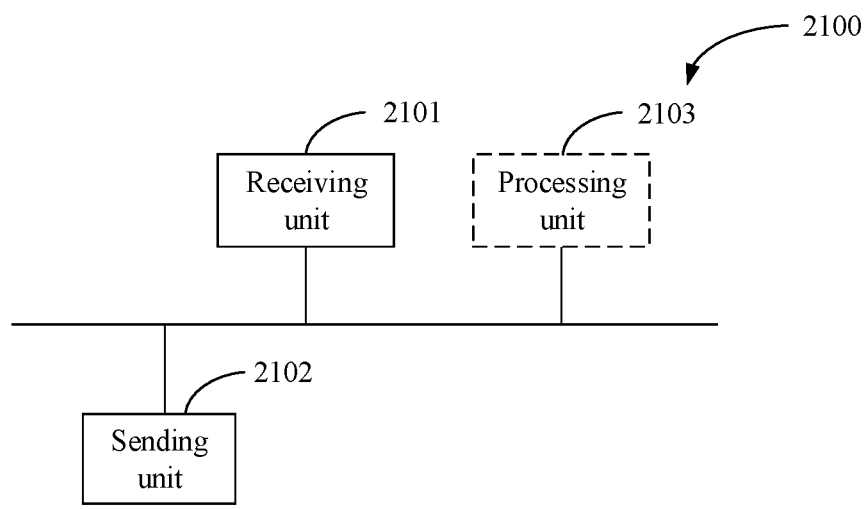
FIG. 19 is a schematic diagram of an apparatus according to at least an embodiment of this application.

In this application, the access gateway device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that module division in this application is an example and is merely a logical function division. In some embodiments, another division manner may be used. For example, when each functional module is obtained through division based on each corresponding function, FIG. 19 is a schematic diagram of an apparatus. An apparatus 2100 may be the access gateway device in the foregoing embodiments. The apparatus 2100 includes a receiving unit 2101 and a sending unit 2102. In some embodiments, the apparatus 2100 further includes a processing unit 2103.

In a method, the receiving unit 2101 is configured to receive a fixed network packet carried in a first fixed network session, where the fixed network packet includes fixed network session characteristic information, and the fixed network session characteristic information is used to identify the fixed network packet.

The sending unit 2102 is configured to send the fixed network packet to a user plane function network element based on information about a first interface corresponding to the fixed network session characteristic information, where the first interface is an interface between the access gateway device and the user plane function network element.

In a design, the processing unit 2101 is configured to: determine the fixed network session characteristic information, and establish an association relationship between the fixed network session characteristic information and the information about the first interface.

In a design, the fixed network session characteristic information is line information, the line information includes link information and virtual interface information, the link information is used to indicate access information of the terminal, and the virtual interface information is used to indicate a virtual port for access of the fixed network packet.

In a design, the receiving unit 2101 is specifically configured to receive a signaling packet carried in the first fixed network session, where the signaling packet includes first fixed network session characteristic information.

That the processing unit 2103 is configured to determine the fixed network session characteristic information specifically includes: obtaining the first fixed network session characteristic information from the signaling packet, and determining the fixed network session characteristic information of the fixed network packet based on the first fixed network session characteristic information.

In a design, the first fixed network session characteristic information is line information. That the processing unit 2101 is configured to determine the fixed network session characteristic information specifically includes: determining the line information as the fixed network session characteristic information of the fixed network packet.

In a design, the first fixed network session characteristic information is packet characteristic information, and the packet characteristic information includes one or more of a media access control MAC address, virtual local area network VLAN information, and a session protocol type.

That the processing unit 2101 is configured to determine the fixed network session characteristic information specifically includes: determining the line information corresponding to the packet characteristic information based on the packet characteristic information; and determining the line information as the fixed network session characteristic information of the fixed network packet.

In a design, the sending unit 2102 is further configured to send a session creation message and the line information to an access and mobility management function network element, where the session creation message is associated with the line information.

The receiving unit 2101 is further configured to receive a session creation completion message sent by the access and mobility management function network element, where the session creation completion message includes tunnel information of the user plane function network element and is associated with the line information.

The processing unit 2101 is specifically configured to: obtain, based on the line information, the tunnel information of the user plane function network element from the session creation completion message associated with the line information, where the information about the first interface includes the tunnel information of the user plane function network element and tunnel information of the access gateway device; and establish an association relationship between the line information and the information about the first interface.

In a design, the receiving unit 2101 is further configured to: receive a signaling packet carried in a second fixed network session, where the signaling packet includes the link information; receive a session creation message, where the session creation message includes the virtual interface information; and receive the virtual interface information from an access and mobility management function network element.

The sending unit 2102 is further configured to send the session creation message to the access and mobility management function network element.

That the processing unit 2103 is configured to determine the fixed network session characteristic information specifically includes: obtaining the link information from the signaling packet; and determining the fixed network session characteristic information based on the link information and the virtual interface information.

In a design, the receiving unit 2101 is further configured to: receive a signaling packet carried in a second fixed network session, where the signaling packet includes the link information; receive a session creation message, where the session creation message includes the virtual interface information; and receive the fixed network session characteristic information from an access and mobility management function network element.

That the processing unit 2101 is configured to determine the fixed network session characteristic information specifically includes: obtaining the link information from the signaling packet, and using, as the fixed network session characteristic information of the fixed network packet, the fixed network session characteristic information that is received by the receiving unit 2101.

The sending unit 2102 is further configured to: send the link information to the access and mobility management function network element; and send the session creation message to the access and mobility management function network element.

In a design, the receiving unit 2101 is further configured to: receive a session creation message, where the session creation message includes service information corresponding to the fixed network packet; and receive the service information from an access and mobility management function network element.

The sending unit 2102 is configured to send the session creation message to the access and mobility management function network element.

That the processing unit 2101 is configured to determine the fixed network session characteristic information specifically includes: determining, from subscription data based on the service information, the fixed network session characteristic information corresponding to the service information.

In a design, that the receiving unit 2101 is configured to determine the fixed network session characteristic information specifically includes: receiving a session creation message, where the session creation message includes service information corresponding to the fixed network packet; and receiving the fixed network session characteristic information that corresponds to the service information and that is sent by the access and mobility management function network element.

The sending unit is configured to send the session creation message to the access and mobility management function network element.

In a design, the receiving unit 2101 is further configured to: receive a signaling packet, where the signaling packet includes the link information; and receive the virtual interface information from a resource management network element.

That the processing unit 2103 is configured to determine the fixed network session characteristic information specifically includes: obtaining the link information from the signaling packet; and determining the fixed network session characteristic information based on the link information and the virtual interface information.

The sending unit 2102 is configured to send a request message to the resource management network element, where the request message includes the link information and is used to request allocation of a fixed network session resource.

In a design, the receiving unit 2101 is further configured to: receive a signaling packet, where the signaling packet includes the link information; and receive the virtual interface information that is sent by the terminal through a second interface, where the second interface is an interface between the terminal and the access gateway device.

That the processing unit 2103 is configured to determine the fixed network session characteristic information specifically includes: obtaining the link information from the signaling packet; and determining the fixed network session characteristic information based on the link information and the virtual interface information.

In a design, the fixed network session characteristic information is packet characteristic information, and the packet characteristic information includes one or more of a media access control MAC address, virtual local area network VLAN information, and a session protocol type.

In a design, the receiving unit 2101 is further configured to receive the fixed network session characteristic information that is sent by the terminal through a second interface, where the second interface is an interface between the terminal and the access gateway device.

In some embodiments, the processing unit 2103 is further configured to: establish a correspondence between the fixed network session characteristic information and identification information, where the identification information is used to identify a to-be-created session; obtain tunnel information of the user plane function network element from a session creation completion message based on the correspondence between the fixed network session characteristic information and the identification information; and establish an association relationship between the line information and the information about the first interface, where the information about the first interface includes the tunnel information of the user plane function network element and tunnel information of the access gateway device.

The sending unit 2102 is further configured to: send a session creation message and the identification information to the access and mobility management function network element, where the session creation message is associated with the identification information.

The receiving unit 2101 is further configured to receive a session creation completion message sent by the access and mobility management function network element, where the session creation completion message includes the tunnel information of the user plane function network element and is associated with the identification information.

In a design, the receiving unit 2101 is further configured to receive, from the terminal, an identifier of an internet protocol IP obtaining mode, where the identifier of the IP obtaining mode is a point-to-point protocol over Ethernet PPPoE.

The processing unit 2103 is further configured to allocate a PPPoE session identifier to the terminal.

The sending unit 2102 is further configured to send the PPPoE session identifier to the access and mobility management function network element.

In this embodiment, the access gateway device is presented in a form in which each functional module is obtained through division based on each corresponding function, or the access gateway device is presented in a form in which each functional module is obtained through division in an integrated manner. The "module" herein may be an application-specific integrated circuit (ASIC), a circuit, a processor and a memory for executing one or more software or firmware programs, an integrated logic circuit, and/or another device that can provide the foregoing function.

In some embodiments, the foregoing apparatus 2100 may be further divided into a processing unit and a communications unit. The processing unit has a function of the foregoing processing unit 2103, and the communications unit has functions of the foregoing receiving unit 2101 and sending unit 2102.

It should be understood that the access gateway device may be configured to implement the steps performed by the access gateway device in the methods in the embodiments of the present disclosure. For related features, refer to the foregoing descriptions. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. In some embodiments, the general processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor so that the processor may read information from the storage medium and write information to the storage medium. Alternatively, the storage medium may further be integrated into a processor. The processor and the storage medium may be disposed in an ASIC, and the ASIC may be disposed in a terminal device. Alternatively, the processor and the storage medium may also be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely example descriptions of the present disclosure defined by the accompanying claims, and are considered as covering any or all of modifications, variations, combinations, or equivalents that are within the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A fixed network packet sending method, comprising:
receiving, by an access gateway device, a fixed network packet included in a first fixed network session, wherein the fixed network packet comprises fixed network session characteristic information useable to identify the fixed network packet;
sending, by the access gateway device, the fixed network packet to a user plane function network element based on information of a first interface corresponding to the fixed network session characteristic information, wherein the first interface is an interface between the access gateway device and the user plane function network element;
receiving, by the user plane function network element, the fixed network packet;
determining, by the access gateway device, the fixed network session characteristic information;
establishing, by the access gateway device, an association relationship between the fixed network session characteristic information and the first interface information;
sending, by the access gateway device, a session creation message and a line information to an access and mobility management function network element, wherein the session creation message is associated with the line information;
receiving, by the access and mobility management function network element, the session creation message and the line information;
sending, by the access and mobility management function network element, a session creation completion message to the access gateway device, wherein the session creation completion message comprises tunnel information of the user plane function network element and is associated with the line information;
receiving, by the access gateway device, the session creation completion message; and
obtaining, by the access gateway device based on the line information, the tunnel information of the user plane function network element from the session creation completion message associated with the line information; wherein
the establishing, by the access gateway device, the association relationship between the fixed network session characteristic information and the first interface information comprises:

establishing, by the access gateway device, an association relationship between the line information and the first interface information, wherein the first interface information comprises the tunnel information of the user plane function network element and tunnel information of the access gateway device.

2. The method according to claim 1, wherein the fixed network session characteristic information is the line information, the line information comprises link information and virtual interface information, the link information indicates access information of a terminal, and the virtual interface information indicates a virtual port for access of the fixed network packet.

3. The method according to claim 2, wherein the determining, by the access gateway device, the fixed network session characteristic information comprises:
receiving, by the access gateway device, a signaling packet included in the first fixed network session, wherein the signaling packet comprises first fixed network session characteristic information; and
obtaining, by the access gateway device, the first fixed network session characteristic information from the signaling packet, and determining the fixed network session characteristic information of the fixed network packet based on the first fixed network session characteristic information.

4. The method according to claim 2, wherein the determining, by the access gateway device, the fixed network session characteristic information comprises:
receiving, by the access gateway device, a signaling packet included in a second fixed network session and obtaining the link information from the signaling packet, wherein the signaling packet comprises the link information;
receiving, by the access gateway device, a session creation message and sending the session creation message to an access and mobility management function network element, wherein the session creation message comprises the virtual interface information;
receiving, by the access and mobility management function network element, the session creation message;
sending, by the access and mobility management function network element, the virtual interface information to the access gateway device;
receiving, by the access gateway device, the virtual interface information from the access and mobility management function network element; and
determining, by the access gateway device, the fixed network session characteristic information based on the link information and the virtual interface information.

5. The method according to claim 2, wherein the determining, by the access gateway device, the fixed network session characteristic information comprises:
receiving, by the access gateway device, a signaling packet and obtaining the link information from the signaling packet, wherein the signaling packet comprises the link information;
receiving, by the access gateway device, the virtual interface information sent by the terminal through a second interface, wherein the second interface is an interface between the terminal and the access gateway device; and
determining, by the access gateway device, the fixed network session characteristic information based on the link information and the virtual interface information.

6. The method according to claim 1, wherein the fixed network session characteristic information is packet characteristic information, and the packet characteristic information comprises one or more of a media access control (MAC) address, virtual local area network (VLAN) information, or a session protocol type.

7. The method according to claim 6, wherein the determining, by the access gateway device, the fixed network session characteristic information comprises:
receiving, by the access gateway device, the fixed network session characteristic information from a terminal through a second interface, wherein the second interface is an interface between the terminal and the access gateway device.

8. The method according to claim 5, wherein the method further comprises:
establishing, by the access gateway device, a correspondence between the fixed network session characteristic information and identification information, wherein the identification information identifies a to-be-created session;
sending, by the access gateway device, a session creation message and the identification information to an access and mobility management function network element, wherein the session creation message is associated with the identification information;
receiving, by the access and mobility management function network element, the session creation message;
sending, by the access and mobility management function network element, a session creation completion message to the access gateway device, wherein the session creation completion message comprises tunnel information of the user plane function network element and is associated with the identification information;
receiving, by the access gateway device, the session creation completion message; and
obtaining, by the access gateway device, the tunnel information of the user plane function network element from the session creation completion message based on the correspondence between the fixed network session characteristic information and the identification information; wherein
the establishing, by the access gateway device, the association relationship between the fixed network session characteristic information and the first interface information comprises:
establishing, by the access gateway device, an association relationship between the line information and the first interface information, wherein the first interface information comprises the tunnel information of the user plane function network element and tunnel information of the access gateway device.

9. A system, comprising an access gateway device and a user plane function network element, wherein
the access gateway device is configured to: receive a fixed network packet included in a first fixed network session, wherein the fixed network packet comprises fixed network session characteristic information useable to identify the fixed network packet; and send the fixed network packet to the user plane function network element based on information of a first interface corresponding to the fixed network session characteristic information, wherein the first interface is an interface between the access gateway device and the user plane function network element;
the user plane function network element is configured to receive the fixed network packet from the access gateway device;

determine the fixed network session characteristic information of the fixed network packet, and establish an association relationship between the fixed network session characteristic information and the first interface information;

send a session creation message and a line information to the access and mobility management function network element, wherein the session creation message is associated with the line information;

the access and mobility management function network element is configured to receive the session creation message and the line information;

send a session creation completion message to the access gateway device, wherein the session creation completion message comprises tunnel information of the user plane function network element and is associated with the line information; wherein the access gateway device is further configured to:

receive the session creation completion message; and obtain, based on the line information, the tunnel information of the user plane function network element from the session creation completion message associated with the line information;

wherein the access gateway device is configured to establish an association relationship specifically comprises being configured to:

establish an association relationship between the line information and the first interface information, wherein the first interface information comprises the tunnel information of the user plane function network element and tunnel information of the access gateway device.

10. The system according to claim 9, wherein the fixed network session characteristic information is the line information, the line information comprises link information and virtual interface information, the link information indicates access information of a terminal, and the virtual interface information indicates a virtual port for access of the fixed network packet.

11. The system according to claim 10, further comprising:

an access and mobility management function network element, wherein the fixed network session characteristic information is line information, the line information comprises link information and virtual interface information, the link information indicates access information of a terminal, and the virtual interface information indicates a virtual port for access of the fixed network packet; and the system further comprises an access and mobility management function network element, wherein the access gateway device is further configured to determine the fixed network session characteristic information of the fixed network packet comprises being configured to:

receive a signaling packet included in a second fixed network session and obtaining the link information from the signaling packet, wherein the signaling packet comprises the link information;

receive a session creation message and sending the session creation message to the access and mobility management function network element, wherein the session creation message comprises the virtual interface information; and determine the fixed network session characteristic information of the fixed network packet based on the link information and the virtual interface information; and the access and mobility management function network element is configured to send the virtual interface information to the access gateway device.

12. The system according to claim 10, wherein the access gateway device is further configured to determine the fixed network session characteristic information of the fixed network packet comprises being configured to:

receive a signaling packet and obtaining the link information from the signaling packet, wherein the signaling packet comprises the link information;

receive the virtual interface information that is sent by the terminal through a second interface, wherein the second interface is an interface between the terminal and the access gateway device; and determine the fixed network session characteristic information based on the link information and the virtual interface information.

13. The system according to claim 9, wherein the fixed network session characteristic information is packet characteristic information, and the packet characteristic information comprises one or more of a media access control (MAC) address, virtual local area network (VLAN) information, or a session protocol type.

14. The system according to claim 13, wherein the access gateway device is configured to determine the fixed network session characteristic information comprises being configured to:

receive the fixed network session characteristic information from a terminal through a second interface, wherein the second interface is an interface between the terminal and the access gateway device.

15. The system according to claim 12, further comprising an access and mobility management function network element, wherein the access gateway device is further configured to establish a correspondence between the fixed network session characteristic information and identification information, wherein the identification information identifies a to-be-created session;

send a session creation message and the identification information to the access and mobility management function network element, wherein the session creation message is associated with the identification information;

the access and mobility management function network element is configured to:

receive the session creation message;

send a session creation completion message to the access gateway device, wherein the session creation completion message comprises tunnel information of the user plane function network element and is associated with the identification information;

wherein the access gateway device is further configured to:

receive the session creation completion message; and obtain the tunnel information of the user plane function network element from the session creation completion message based on the correspondence between the fixed network session characteristic information and the identification information;

wherein the access gateway device is configured to establish the association relationship between the fixed network session characteristic information and the first interface information comprises being configured to establish an association relationship between the line information and the first interface information, wherein the first interface information comprises the tunnel information of the user plane function network element and tunnel information of the access gateway device.

\* \* \* \* \*